(12) United States Patent
Maruyama et al.

(10) Patent No.: US 8,260,731 B2
(45) Date of Patent: Sep. 4, 2012

(54) INFORMATION CLASSIFICATION SYSTEM, INFORMATION PROCESSING APPARATUS, INFORMATION CLASSIFICATION METHOD AND PROGRAM

(75) Inventors: Daisuke Maruyama, Machida (JP); Kazuo Aoki, Shizuoka-ken (JP); Takehiko Ishii, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 12/342,300

(22) Filed: Dec. 23, 2008

(65) Prior Publication Data

US 2009/0248671 A1    Oct. 1, 2009

(30) Foreign Application Priority Data

Mar. 28, 2008   (JP) .................................. 2008-87611

(51) Int. Cl.
*G06F 17/30* (2006.01)
(52) U.S. Cl. .......................................... 706/20; 706/46
(58) Field of Classification Search .................. 706/20, 706/46
See application file for complete search history.

(56) References Cited

U.S. PATENT DOCUMENTS

2005/0154690 A1* 7/2005 Nitta et al. .................... 706/46

FOREIGN PATENT DOCUMENTS

JP    3526198 B2    9/1998
JP    2006-343925    12/2006

* cited by examiner

*Primary Examiner* — Alan Chen
*Assistant Examiner* — Ola Olude-Afolabi
(74) *Attorney, Agent, or Firm* — Hoffman Warnick LLC; Daniel McLoughlin

(57) ABSTRACT

An information classification system includes a server that includes a knowledge base that receives classification information to be classified, conducts language analysis of the classification information to acquire a plurality of keywords and classify the plurality of keywords into elements made up of a classification target word and a related word that modifies the classification target word, and conduct a search with the related word being for a judgment condition for decision of the classification while separating the classification target word from the related word, so as to assign a classification identification value to the information; a classification candidate extraction section that extracts the classification identification value that the knowledge base assigns to generate an automatic classification result; and a classification update section that receives the automatic classification result, displays a GUI for classification confirmation allowing confirmation of correctness of the automatic classification result, and corrects registered items in the knowledge base with a correction value received through the GUI for classification confirmation while referring to log data that is a processing history about automatic classification for the language analysis and the element classification.

16 Claims, 16 Drawing Sheets

MAIN CLASSIFICATION TABLE 410

| CLASSIFICATION WORD | CLASSIFICATION VALUE | CLASSIFICATION TARGET WORD |
|---|---|---|
| FRESH VEGETABLE | AAA | CARROT, TOMATO ... |
| COOKED FOOD | BBB | SUSHI, STEAK, HAMBURGER ... |
| FOOD BILL | CCC | HAMBURGER ... |
| FROZEN FOOD | DDD | HAMBURGER ... |
| ... | | ... |

AUXILIARY CLASSIFICATION TABLE 420

| AUXILIARY CLASSIFICATION | RELATED WORD |
|---|---|
| RESTAURANT | A,C,D,E ... |
| SUPERMARKET | F,G,H,I,J,K ... |
| CONVENIENCE STORE | L,M,N,O,P,Q ... |
| ... | ... |

BINARY CONDITION TABLE 430

| ITEM NAME | CONDITION | RESULT |
|---|---|---|
| KAMABOKO | PREFECTURE @ HOUSEHOLD TAB: OKINAWA | AGE-KAMABOKO |
| ... | | ... |

Figure 8:
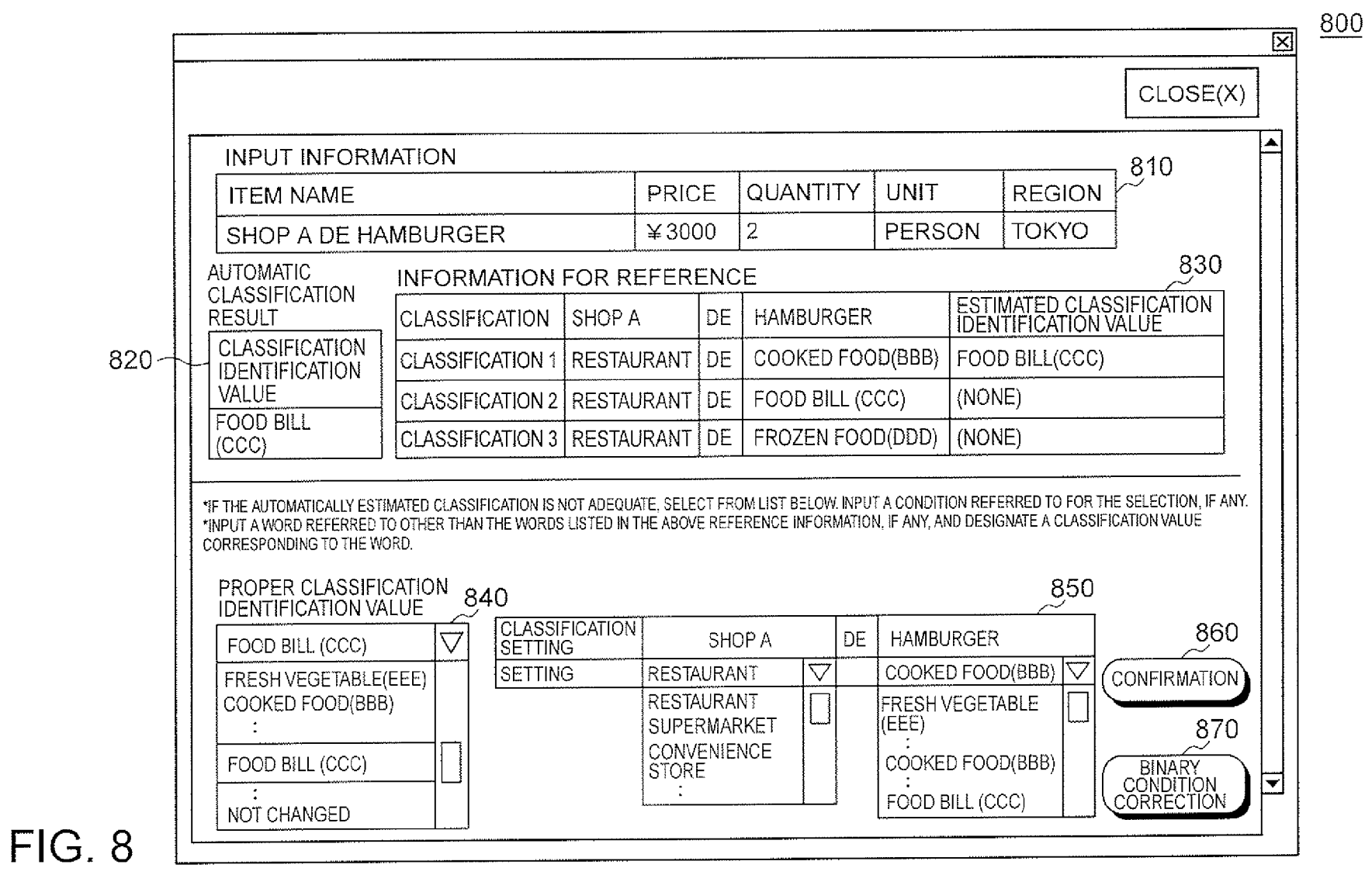

CLOSE(X)

INPUT INFORMATION

| ITEM NAME | PRICE | QUANTITY | UNIT | REGION |
|---|---|---|---|---|
| SHOP A DE HAMBURGER | ¥3000 | 2 | PERSON | TOKYO |

810

INFORMATION FOR REFERENCE — 830

| | CLASSIFICATION | SHOP A | DE | HAMBURGER | ESTIMATED CLASSIFICATION IDENTIFICATION VALUE |
|---|---|---|---|---|---|
| | CLASSIFICATION 1 | RESTAURANT | DE | COOKED FOOD(BBB) | FOOD BILL(CCC) |
| | CLASSIFICATION 2 | RESTAURANT | DE | FOOD BILL (CCC) | (NONE) |
| | CLASSIFICATION 3 | RESTAURANT | DE | FROZEN FOOD(DDD) | (NONE) |

AUTOMATIC CLASSIFICATION RESULT — 820

| CLASSIFICATION IDENTIFICATION VALUE |
|---|
| FOOD BILL (CCC) |

*IF THE AUTOMATICALLY ESTIMATED CLASSIFICATION IS NOT ADEQUATE, SELECT FROM LIST BELOW. INPUT A CONDITION REFERRED TO FOR THE SELECTION, IF ANY.
*INPUT A WORD REFERRED TO OTHER THAN THE WORDS LISTED IN THE ABOVE REFERENCE INFORMATION, IF ANY, AND DESIGNATE A CLASSIFICATION VALUE CORRESPONDING TO THE WORD.

PROPER CLASSIFICATION IDENTIFICATION VALUE — 840

| ▽ |
|---|
| FOOD BILL (CCC) |
| FRESH VEGETABLE (EEE) |
| COOKED FOOD (BBB) |
| : |
| FOOD BILL (CCC) |
| : |
| NOT CHANGED |

CLASSIFICATION SETTING — 850

| | SHOP A | DE | HAMBURGER |
|---|---|---|---|
| SETTING | RESTAURANT | DE | COOKED FOOD(BBB) |
| | RESTAURANT ▽ | □ | FRESH VEGETABLE (EEE) |
| | SUPERMARKET | | COOKED FOOD(BBB) |
| | CONVENIENCE STORE | | FOOD BILL (CCC) |
| | : | | |

[CONFIRMATION] — 860

[BINARY CONDITION CORRECTION] — 870

900

CLOSE (X)

INPUT DATA INFORMATION

| ITEM NAME | PRICE | QUANTITY | UNIT | REGION |
|---|---|---|---|---|
| OYAKI | ¥200 | 2 | CHO | KYOTO |

910

AUTOMATIC CLASSIFICATION RESULT AND CONDITION REFERRED TO FOR THE CLASSIFICATION

| CLASSIFICATION IDENTIFICATION VALUE | PRICE | QUANTITY | UNIT | REGION |
|---|---|---|---|---|
| OTHER FOODS(FFF) | | | | |

920

*IF THE AUTOMATICALLY ESTIMATED CLASSIFICATION IS NOT ADEQUATE, SELECT FROM LIST BELOW. INPUT A CONDITION REFERRED TO FOR THE SELECTION, IF ANY.

PROPER CLASSIFICATION IDENTIFICATION VALUE

TOFU(GGG) ▽

930

CONDITION FOR REFERENCE

| CONDITION | PRICE | QUANTITY | UNIT | REGION |
|---|---|---|---|---|
| VALUE | | | CHO | KYOTO |

940

TOFU(GGG)
:
OTHER FOODS (FFF)
NOT CHANGED

| | 1010 Language Processing | 1020 Matching Processing | 1030 Matching Pattern | 1040 Rule Processing / Binary Condition | 1050 Score Processing / Weighting Condition | 1060 UI / Expert's Know-how | 1070 Priority Extraction Policy | 1080 Feedback Processing / Correction Target in Knowledge Base |
|---|---|---|---|---|---|---|---|---|
| | Word dictionary for morpheme analysis | | | | | | | |
| | ○ | ○ (Perfect matching) | Perfect matching (single) | None or false | - | Required | Proper | Classification target word, related word, binary condition |
| | ○ | ○ (Perfect matching) | Perfect matching (single) | ○ | - | Required | Proper | Classification target word, related word, binary condition |
| | ○ | ○ (Perfect matching) | Perfect matching (plural candidates) | None or false | - | Required | Proper | Classification target word, related word, binary condition, weighting condition |
| | ○ | ○ (Perfect matching) | Perfect matching (plural candidates) | ○ | ○ | Required | Proper | Classification target word, related word, binary condition, weighting condition |
| | ○ | ○ (Partial matching) | Partial matching (single) | - | ○ | Required | Grading | Classification target word, related word, weighting condition |
| | ○ | ○ (Partial matching) | Partial matching (plural candidates) | - | ○ | Required | Grading | Classification target word, related word, weighting condition |
| | ○ | X (Not matching) | Not matching | - | - | - | Proper / Grading | Classification target word, related word |
| | X (Unknown word) | - | | - | - | - | Proper / Grading | User dictionary, classification target word, related word |

1000

1200

1210

CURRENT CLASSIFICATION STATE
HOUSEHOLD INFORMATION:OKINAWA, TWO PEOPLE OR MORE, INCOME: 200,000 JPY, WORKING
CLASSIFICATION ITEM:KAMABOKO, CASH PAYMENT, ONE PIECE, 198 JPY
AUTOMATIC CLASSIFICATION RESULT:HHH

1220

BINARY CONDITION SETTING

| ITEM NAME | REGION | HOUSEHOLD TYPE | INCOME | WORKING OR NOT | PAYMENT METHOD | QUANTITY | UNIT | PRICE | RESULT |
|---|---|---|---|---|---|---|---|---|---|
| KAMABOKO | OKINAWA | TWO OR MORE | 200,000 JPY | WORKING | CASH | 1 | PIECE | 198 JPY | HHI |

CORRECTION BY EXPERT HHH→HHI

...

1230

CURRENT CLASSIFICATION STATE
HOUSEHOLD INFORMATION:TOKYO, SINGLE, INCOME: 180,000 JPY, WORKING
CLASSIFICATION ITEM:KAMABOKO, CASH PAYMENT, TWO PIECES, 288 JPY
AUTOMATIC CLASSIFICATION RESULT:HHH

BINARY CONDITION SETTING    1250   1260                           1270   1240

| ITEM NAME | REGION | HOUSEHOLD TYPE | INCOME | WORKING OR NOT | PAYMENT METHOD | QUANTITY | UNIT | PRICE | RESULT |
|---|---|---|---|---|---|---|---|---|---|
| KAMABOKO | OKINAWA | TWO OR MORE | 180,000~200,000 JPY | WORKING | CASH | 1~2 | PIECE | 198~288 JPY | HHI |
| KAMABOKO | TOKYO | | 180,000~200,000 JPY | WORKING | CASH | 1~2 | PIECE | 198~288 JPY | HHH |

MAIN CLASSIFICATION TABLE 1410

| CLASSIFICATION WORD (1402) | CLASSIFICATION VALUE (1404) | CLASSIFICATION TARGET WORD (1406) |
|---|---|---|
| FRESH VEGETABLE | AAA | CARROT, TOMATO ... |
| COOKED FOOD | BBB | SUSHI, STEAK, HAMBURGER ... |
| FOOD BILL | CCC | HAMBURGER ... |
| FROZEN FOOD | DDD | HAMBURGER ... |
| ... | | |

AUXILIARY CLASSIFICATION TABLE 1420

| AUXILIARY CLASSIFICATION (1422) | RELATED WORD (1424) |
|---|---|
| RESTAURANT | A,C,D,E ... SHOP NEW |
| SUPERMARKET | F,G,H,I,J,K ... |
| CONVENIENCE STORE | L,M,N,O,P,Q ... |
| ... | ... |

BINARY CONDITION TABLE 1430

| ITEM NAME | CONDITION | RESULT |
|---|---|---|
| KAMABOKO | PREFECTURE @ HOUSEHOLD TAB: OKINAWA | AGE-KAMABOKO |
| | AUXILIARY CLASSIFICATION: RESTAURANT + "DE" + CLASSIFICATION: COOKED FOOD | FOOD BILL |
| ... | | ... |

INFORMATION CLASSIFICATION SYSTEM, INFORMATION PROCESSING APPARATUS, INFORMATION CLASSIFICATION METHOD AND PROGRAM

FIELD OF THE INVENTION

The present invention relates to an information classification technique, and more particularly relates to an information classification system, an information processing apparatus, an information classification method and a program, which use a knowledge base capable of evolving using knowledge of experts who can classify information.

BACKGROUND ART

Along with the development of information processing techniques, various types of information have been currently classified and stored in a database for various uses. Although the information registered in a database is diversified, some information can be classified without difficulty simply by language analysis alone for text included in the information. On the other hand, there may be some difficulty in automatic classification by language analysis using a single language for information classification.

Such information may include commodity information or service information with an unclear boundary between service and commodity, account classification information, technical information or the like, especially including information strongly depending on a specific auxiliary attribute, such as a region, a time period, a consumption/action location, an object, or a method. Although information may be classified automatically by an information processing apparatus such as a personal computer or a server computer, if the automatic classification is not appropriate, a so-called expert who has special knowledge about the information classification conventionally corrects the information classification. The expert corrects the information classification by examining the classified information and reflecting their own know-how thereon to correct the result of the automatic classification, so as to assign an appropriate classification code or the like thereto.

Meanwhile, the know-how stored in the brain of the expert still remains there, and in order to reflect such know-how to an information processing apparatus, there is a need to create a classification database beforehand with such know-how from experts directly reflected thereon. Such reflection on a knowledge base has been conventionally conducted by hearing from the experts, which is then reflected to a knowledge base, or by leaving the correction by an expert on a memo every time the correction is made and collectively reflecting the know-how later.

The above-described methods enable the creation of a classification database that requires expert's knowledge. However, it is not always possible to reflect the expert's know-how information exhaustively. For instance, an expert for assigning a code to classified information does not understand the details of the automatic classification system in many cases, and therefore the verified and corrected assigned codes and the know-how therefor tend to remain in the brain of the expert, thus leading to a problem that such know-how is not conveyed fully to a person in another section who perform other jobs using the classified information.

Alternatively, such a person in another section may assign codes by batch processing, and a result thereof may be fed back to an automatic coding system. However, it is not expected that such a person in the other section knows the details of the data configuration of the automatic classification system, and further there are many types of data structures to be managed in the knowledge base, and therefore it takes time to make a judgment about on what knowledge base the know-how should be reflected, so that errors tend to occur.

Conventionally, as a technique of utilizing information on input keywords for types of processing other than search, Japanese Patent No. 3526198 (Patent Document 1) discloses a database search method of searching a database using a keyword similar to the input keyword. Patent Document 1 discloses a database search technique in which a first concept corresponding to a search keyword input by a user, a second concept similar to the first concept, and a similarity evaluation value assigned for each first concept are stored in evaluation case storage means, thus conducting the similar keyword search.

Japanese Patent Application Publication No. 2006-343925 (Patent Document 2) discloses a related-word dictionary creation technique of inputting answer candidates retrieved based on keywords extracted as important words from user's questions in a question-and-answer system and their correctness information in related-word dictionary correction means so as to execute the correction processing of a related-word dictionary, thus executing the processing of increasing the relevance between keywords and answers.

As described above, the prior art teaches that a similar keyword is acquired based on a keyword to conduct a search, and a relevance between the keyword and target information is registered. Patent Document 1 and Patent Document 2, however, simply disclose a technique of using a single keyword to execute information search, which is not a type of technique of using the relevance in terms of the semantics of a plurality of input keywords as judgment conditions to reflect on information classification, rather than using a single keyword for the information classification.

Patent Document 1 and Patent Document 2 make it possible to associate a keyword with a similar target keyword, or enable the association with information such as answers. Patent Document 1 and Patent Document 2, however, are not intended to cope with the classification of information involving a higher level concept for a keyword, or the classification for search or the classification using a semantic relationship that holds for a plurality of keywords.

That is, it is expected that instead of information classification of applying the language analysis technique to the information classification and using matching with just a single word, automatic information classification is conducted with consideration given to semantic attributes using a significant series of words (a word string) for the information classification, thus making it possible to cope with a wider field and range of information as a classification target.

Further, it is expected that when information is classified using semantic attributes given based on a plurality of keywords, know-how based on the information classified by experts is extracted, which is then used for the addition or the correction of the knowledge base, thus making it possible to classify information with accuracy with the expert's know-how reflected thereon appropriately.

Moreover, it is expected that classification information is described using a word string in a short sentence including a plurality of keywords, and the plurality of keywords extracted from the word string are made to function differently in the matching processing in accordance with their functions, whereby further diversified classification processing can be performed.

SUMMARY OF THE INVENTION

The present invention provides an information classification system, an information processing apparatus, an information classification method and a program, which enable the appropriate extraction of know-how that experts have and automatic classification of various types of information using semantic attributes based on a sequence of words, and further enable information classification to which expert's know-how is applied evolutionally.

The present invention also provides an information classification system, an information processing apparatus, an information classification method and a program, which enable the management of additional attributes, which are not used as classification target words and related words during the classification processing in the conventional automatic classification system, as a binary condition for a decision tree in knowledge base, so that the additional attributes can be included as data for the classification processing, thus enabling the detailed classification for wider range of information. As a result, even the classification information that is simply dealt with as partial matching in matching processing described later in the conventional automatic classification system can be processed as perfect matching by corresponding to the registration of the classification target words and related words, whereby a proper classification ratio can be improved.

In the present invention, classification information is described using a plurality of keywords. The plurality of keywords are described as a word string making up a short sentence in which the plurality of keywords give semantics in a certain language based on postpositions, prepositions, and other particles that couple or modify the keywords.

The keywords are subjected to language analysis using morpheme analysis or the like, so that the information to be classified can be classified in the units of keywords into a classification target word and a related word that semantically modifies the classification target word. The keywords used for the classification are separately registered in a main classification table, which registers a classification target word as a direct target of the classification, and an auxiliary classification table, which registers a related word for each semantic attribute that affects the automatic classification of the classification target word. The semantic attributes are also used as binary conditions together with variety of additional attributes such as a region, a season, a time period, a technical feature and the like. As a result, different functions can be given to the plurality of keywords, thus enabling flexible and sophisticated classification processing for many types of classification information.

Using the result of the language analysis of the classification information, keyword search, binary condition judgment and weighting are executed with the knowledge base, thus deciding a classification identification value candidate that is to be assigned to the classification information. The decided classification identification value candidate is displayed on a user interface (UI) for allowing the classification confirmation, which is included in a desktop screen of the information processing apparatus. The binary condition is selected from the related word that modifies the classification target or from the additional conditions, and these values are associated with the classification target word and registered in a binary condition table together with the judgment result. In the case where the binary condition judgment is registered with respect to a specific classification target word, a result of the binary condition judgment is prioritized for giving the classification identification value.

The classification identification value candidate is presented in such a manner that the classification identification value assigned to the classification information as a result of the automatic classification by the information processing apparatus, the binary condition values used therefor, and additional information that describes the classification information are displayed on the UI for allowing the correction.

In the case where the classification identification value, the binary condition value and the like of the classification identification value candidate are added or corrected, log data with the processing history recorded thereon is analyzed to specify a data structure of a correction target and further specify a correction target address. The information processing apparatus uses the specified correction target address to replace a value of the corresponding data structure in the knowledge base with the received correction value, thus correcting registered items so that the reflection can be made on a word dictionary database, an auxiliary classification table, a binary condition table, a weighting table and the like in the knowledge base.

In the case where a plurality of keywords describing the input classification information are subsequently input, the information classification system assigns a proper classification identification value to the classification information using the classification result based on the language analysis and the language element classification.

According to the present invention, an information classification system, an information processing apparatus, an information classification method and a program can be provided, which enable the appropriate extraction of know-how that experts have and proper information classification using semantic attributes based on a sequence of words, and further enable information classification to which expert's know-how is taken evolutionally.

BRIEF DESCRIPTION OF THE DRAWINGS

FIG. 4 illustrates one embodiment of a data structure that the classification database includes.

FIG. 8 illustrates one embodiment of a classification confirmation GUI that the classification update section displays on the client in the present embodiment.

FIG. 9 illustrates another embodiment for the classification confirmation GUI that is displayed when the user judges that the binary condition has to be corrected in FIG. 8 and clicks the binary condition correction button.

FIG. 10 illustrates a table indicating an automatic classification policy enabling the automatic classification by referring to the log data and the reflection of the correction on the knowledge base.

FIG. 12 describes one embodiment of correction reflection processing of the classification table included in the classification database at a level of a data structure.

FIG. 13, comprising

FIG. 14 illustrates an embodiment of a corrected classification table used when the information classification system of the present embodiment corrects the classification database with the setting by a user, especially by an expert user reflected thereon.

FIG. 15, comprising FIGS. 15(a) and 15(b), illustrates one embodiment of the automatic classification result before and after the classification updating processing of the present embodiment in the case of not-classified occurring in FIG. 14.

DETAILED DESCRIPTION OF THE INVENTION

Figure 1:
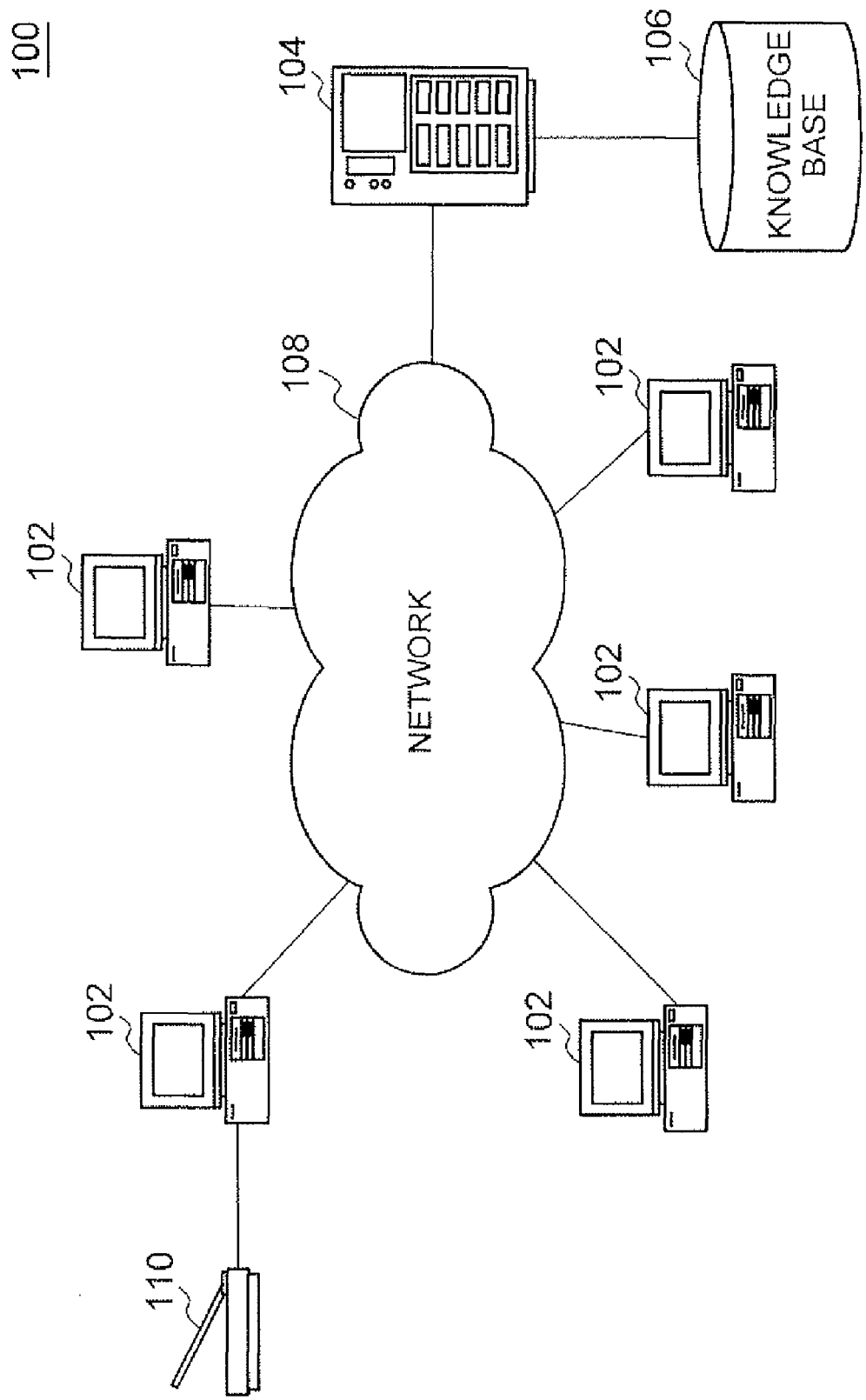
FIG. 1 illustrates one embodiment of an information classification system of the present embodiment.

The following describes the present invention by way of embodiments, which do not limit the present invention. FIG. 1 illustrates one embodiment of an information classification system 100 according to the present invention. The information classification system 100 includes a plurality of client computers (hereinafter referred to as clients) 102 and a server computer (hereinafter simply referred to as a server) 104 that receives classification information from the clients 102 as well as additional information containing various types of information relating to the classification information and assigns classification identification values to the classification information. The server 104 returns, to a client, a classification result obtained by using a current knowledge base managed by the server 104, so as to allow a user to judge the correctness of the classification result. The information classification system 100 may further include a classification information readout apparatus 110. The classification information readout apparatus 110 of FIG. 1 is connected with a client 102 so that the classification information acquired by the client 102 can be transmitted to the server 104 via a network 108. The classification information readout apparatus 110 may be connected with the server 104 or an information processing apparatus managed locally by the server 104. The classification information readout apparatus 110 acquires the classification information using an OCR, a barcode, a QR code or the like, and transmits the same to the server 104 via the client 102. In another embodiment, an information processing apparatus connected locally may acquire classification information and transmit the same to the server 104. Alternatively, the server 104 may be directly connected with the classification information readout apparatus 110, so as to acquire the classification information directly.

The clients 102 and the server 104 are mutually connected via the network 108. The clients 102 and the server 104 may be configured via the network 108 as a distributed computing environment by using a transaction protocol such as TCP/IP. The transaction between the clients 102 and the server 104 may be conducted using a HTTP protocol, and a web/server configuration may be implemented so that a web browser can be implemented on the side of the clients 102 and a server program such as Common Gateway Interface (CGI), servlet, or data base application can be implemented on the server 104 side.

The clients 102 may be a personal computer or a work station, including any known single core processor or multi-core processor. The clients 102 may be implemented with any operating system.

Meanwhile, the server 104 may be equipped with a microprocessor configured using a single core or multicore architecture. The server 104 may be implemented as a proxy server of distributed computing or as a web server as long as the server 104 can be controlled by an operating system, can process a classification request from the clients 102, and can return a process result to the clients 102.

A user of a client 102 connected to the network 108 may be a general user or an expert user. The general user transmits classification information from the client 102 to the server 104. The server 104 can store a predetermined pieces of classification information in a job queue, for example, receive a classification execution request from a client 102 operated by the expert user, and execute the classification of a plurality of pieces of classification information collectively. In still another embodiment, all of the clients 102 connected to the network 108 may be operated by the expert users, and may issue a request for the processing of the classification information in a field different for each expert to the server 104. In the case where a net classification service is conducted using Social Network Service (SNS), for example, the user may be a SNS subscriber connected with the network 108.

In order to assign the classification identification values to the classification information, the server 104 includes a knowledge base 106 for storing various types of data structures in a hard disk device or the like and reading out the same to execute the information classification. The classification identification values may be configured as classification words and classification values made up of numerical value data corresponding to the classification words and classification code values for making it easy for a user to recognize the classification information. Herein, the data configuration of the classification identification value may be appropriately selected in accordance with a specific use.

In the following description, the classification word and the classification value will be referred to simply and collectively as a classification identification value except for the case where the classification word and the classification value have to be referred to separately. The knowledge base 106 is accessed by various types of functional means that are implemented on the information processing apparatus obtained by deploying an application on a RAM or the like during the execution of the application by the server 104, and provides various types of information. Further, various types of information are registered in the knowledge base 106. The data structures managed by the knowledge base 106 may include, for example, a word dictionary database, a classification database, and log data.

Figure 2:
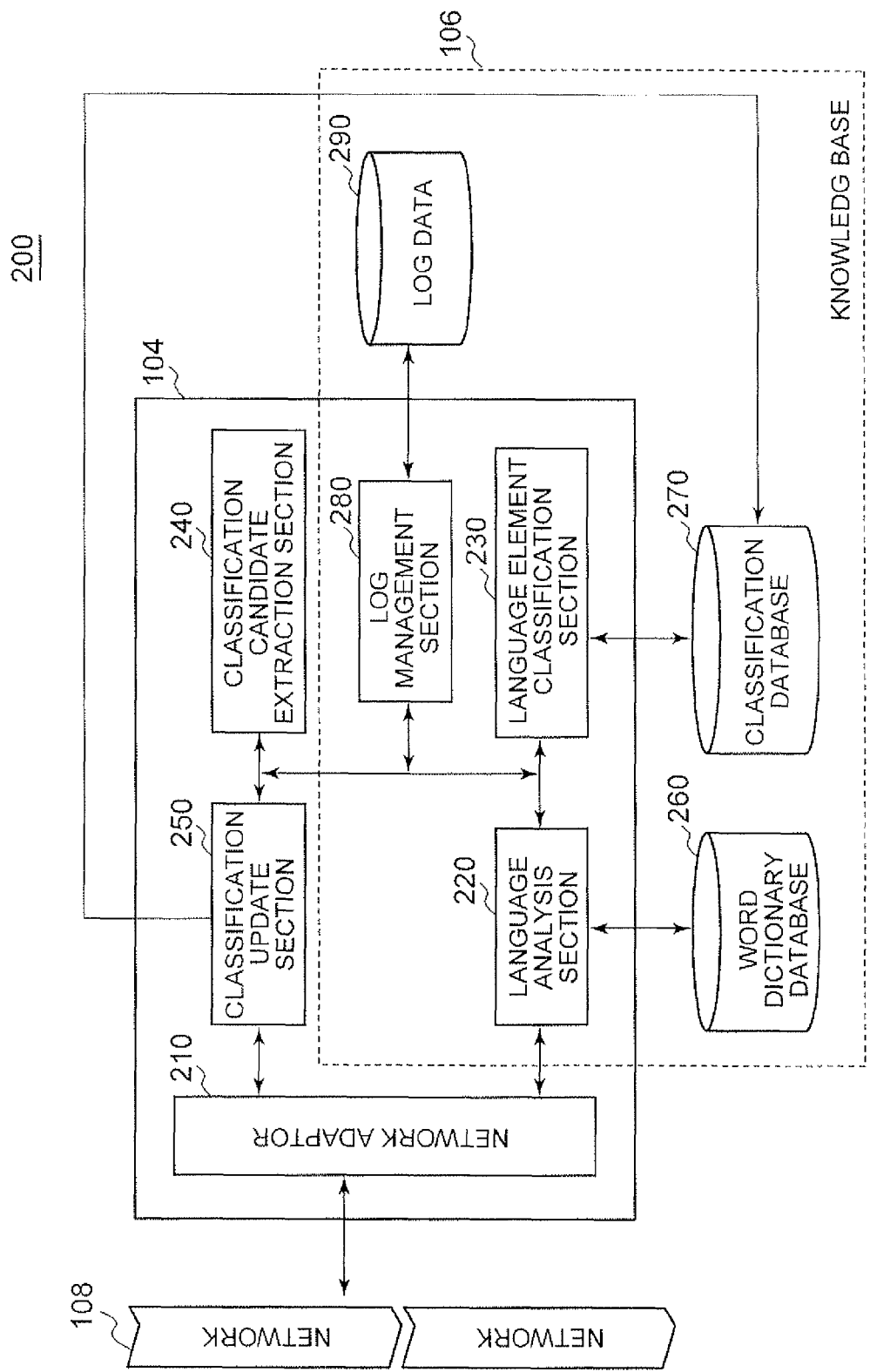
FIG. 2 illustrates a functional block configuration of the server of the present embodiment.

FIG. 2 illustrates a functional block configuration of the server 104 of the present embodiment. The server 104 receives a classification request from a client 102 via the network 108 together with classification information corresponding thereto or together with classification information and additional information. The classification request and the classification information are passed to a servlet, CGI, or the like of the server 104 via a network adapter 210, and thereafter various functional blocks are called, so that the respective processing is executed.

The server 104 includes a language analysis section 220 for acquiring a keyword from the classification information, and a language element classification section 230. Upon receipt of a separation request, the language analysis section 220 conducts keyword analysis of the classification information using a word dictionary database 260, for example, recognizing as in "keyword 1"+"postpositional particle"+"keyword 2". Note here that, in the case of Japanese, a postpositional particle is assigned between keywords, whereas a preposition, an article, or a blank word, which gives certain meaning before or after a keyword, may be assigned in other languages such as English. Further, in the case where the keyword can be further classified into a plurality of sub-keywords by referring to the word dictionary database 260, for example, as in "raisin butter bread", the language analysis section 220 acquires the sub-keywords as well to use the same for classification.

To this end, the word dictionary database 260 includes dictionary data for language analysis registered therein, as well as a morpheme dictionary, a postpositional particle dictionary, a grammar dictionary, and the like for keyword analysis. The word dictionary database may include the following data structures.

(1) Expression instability table: a data structure corresponding to expression instability of a keyword.

(2) Higher/lower level concept table: a data structure for classification with consideration given to a higher/lower level concept when a keyword is partially different.

The word dictionary database 260 further includes a user dictionary that a user updates to let the registered contents thereof evolve and a system dictionary that keeps the contents at the time of initialization, where a different user dictionary can be provided for each expert user or for each field. The language analysis section 220 notifies the language element classification section 230 of values of the generated keyword, sub-keyword, postpositional particle, and the like.

The language element classification section 230 uses the received result of the language analysis, and requests different processing to the classification database 270 depending on whether a keyword obtained as a result of the language analysis specifies a classification target or modifies a classification target. In the different processing, different structures are searched with respect to a semantic attribute and a classification target word, respectively, where as for the semantic attribute, binary condition judgment is executed using the search result. As for the classification target word, processing of searching for a classification identification value corresponding to the classification target word may be included.

In order to assign an optimum classification identification value to be assigned to the classification information, the language element classification section 230 uses a main classification table, an auxiliary classification table, a binary condition table, a weighting condition table, and an occurrence table of a classification database 270 to execute the classification processing. After completion of the classification processing, the language element classification section 230 provides notification to a classification candidate extraction section 240 to extract a candidate for the classification identification value assigned by the language element classification section 230. The language element classification processing by the language element classification section 230 is applied as follows to the classification information="Shop A de Sushi":

TABLE 1

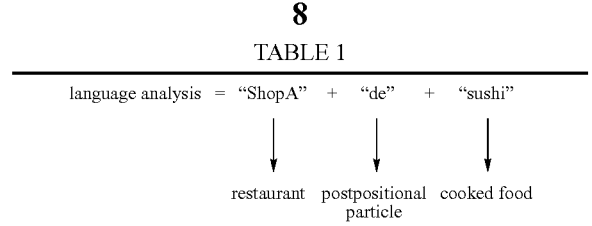

In Table 1, "Shop A" and "Sushi" are keywords acquired by the language analysis section 220, and "de" is a postpositional particle. ("Shop A de sushi" is an expression in Japanese, which corresponds to an English expression "Sushi at Shop A". The postpositional particle "de" in Japanese corresponds to the prepositional particle "at" in English.) In the embodiment of Table 1, the expression instability table and the higher/lower level concept table are applied to "Shop A" and "Sushi" to apply the language analysis thereto. Thereby, "restaurant", which is associated with a related word "Shop A" and gives a semantic attribute modifying a classification target word, such as an object, a type, a method or the like of the related word, is retrieved from the auxiliary classification table and assigned thereto. As for "Sushi", which is a classification target word identified by having a modified relationship based on a Japanese word order and a type of the postpositional particle, "cooked food" is retrieved from the main classification table and assigned thereto.

It should be considered here that, in the information classification processing, the classification information may provide different meanings depending on specific fields or types of postpositional particles. For instance, in the case where "Shop A" has a meaning of a Sushi restaurant or of providing cooked food, "cooked food" may not be appropriate for the keyword "Sushi". For that reason, the language element classification section 230 refers to the classification database 270 using the keyword acquired by the language analysis section 220, and executes the classification judgment processing in accordance with the language element.

Hereinafter, in the present embodiment, among the various functions provided by the server 104, the language analysis section 220, the language element classification section 230, a log management section 280, the word dictionary database 260, the classification database 270, and log data 290 are referred to as the knowledge base because they enable the information classification with expert's know-how reflected thereon.

Meanwhile, the classification database 270 includes classification identification values registered therein, which are to be assigned to the classification information. More specifically, the classification database 270 may include the following data structures.

(3) Main classification table: a data structure for assigning a classification system having a classification name and a code.

(4) Auxiliary classification table: a data structure for assigning a synonym or the like with a related word that cannot be classified using a classification name.

(5) Binary condition table: a data structure that changes the classification in accordance with the contents of a keyword so as to deal with the individual classification.

(6) Weighting condition table: a data structure for registering a weighting condition used for calculating a score value that specifies a priority concerning the selection for an automatic classification result when a plurality of classification identification value candidates are found.

(7) Occurrence table: a data structure for registering an expectation of occurrence in association with an attribute of a keyword to calculate a score value.

The above-described various types of data structures may be configured as a database, or a table or a list created with an object oriented programming language. The database may be a relational database or may be an object oriented database (OODB). In the case of the relational database, various types of search may be executed using Structured Query Language (SQL), or may be executed by setting a search command used for a specific OODB or the like.

When the classification candidate extraction section 240 is notified of the assignment of the classification identification value candidate, the classification candidate extraction section 240 extracts a classification candidate using a weighting value or the like from the classification identification values assigned by the language element classification section 230. The classification candidate extraction section 240 further acquires values of the binary condition and the weighting condition that were used for extracting the classification candidate, and notifies a classification update section 250 of the same.

In the illustrated embodiment, the classification update section 250 transmits a GUI for prompting classification confirmation in a specific form, for example, thus making the classification confirmation GUI display on a desktop screen of the client 102. When recognizing the classification confirmation GUI on the desktop screen of the client 102, the user examines the values in fields formed on the form using the expert's know-how, corrects the same when the correction is required, and transmits a result thereof to the server 104 via the network 108, thus passing the user's correction result to the classification update section 250 via servlet or CGI processing. Note that in FIG. 2 the classification update section 250 is indicated by broken lines. This is because after learning from the expert's know-how, appropriate automatic classification can be executed without calling the classification update section 250 during the automatic execution.

The classification update section 250 makes a judgment as to whether the correction was made or not by a comparison with a transmitted value registered in a web cache, for example. The classification update section 250 sets such correction as a classification identification value for the classification information, and stores the same in an appropriate storage region. The stored corrected value is used for updating the knowledge base 106 during the classification updating processing.

When it is judged that the correction was made, the classification update section 250 specifics each data structure concerning the correction by referring to the log data 290, notifies the classification database 270 of the correction contents, and executes the updating processing of the corresponding data structure. When a new keyword is added, the classification update section 250 notifies the language analysis section 220 and the classification database 270 as such, so as to acquire the new keyword and a binary condition, a weighting value and the like therefor and update entry items in the word dictionary database 260 and the classification database 270.

With the use of the respective data structures and functional blocks described above, the information classification system 100 allows the expert's know-how to be reflected automatically on the word dictionary database 260 and classification database 270, thus improving the classification accuracy evolutionally and enhancing the value as the knowledge base. The above-described hardware configuration is based on the assumption that the server 104 is a web server, and the client 102 with browser software implemented therein executes transaction based on the HTTP protocol.

Needless to say, another embodiment is also possible, in which another distributed computing infrastructure is used, and a dedicated client program and server program are implemented, so that they are implemented as a client-server system capable of providing a classification confirmation GUI using window class, window method or the like.

The log management section 280 shown in FIG. 2 manages a specific classification request in the units of transactions, and registers a processing history of each of the classification information reception processing, the language analysis processing, the language terminology classification processing, the classification candidate extraction processing, and the classification update processing. Further, in order to conduct the classification correction in response to an inquiry from the classification update section 250, the log management section 280 notifies the classification update section 250 of information on an correction target address such as a data structure to be corrected, a record identification value, a field identification value and the like, thus enabling the update processing of the knowledge base 106 with the expert's know-how reflected thereon.

Figure 3:
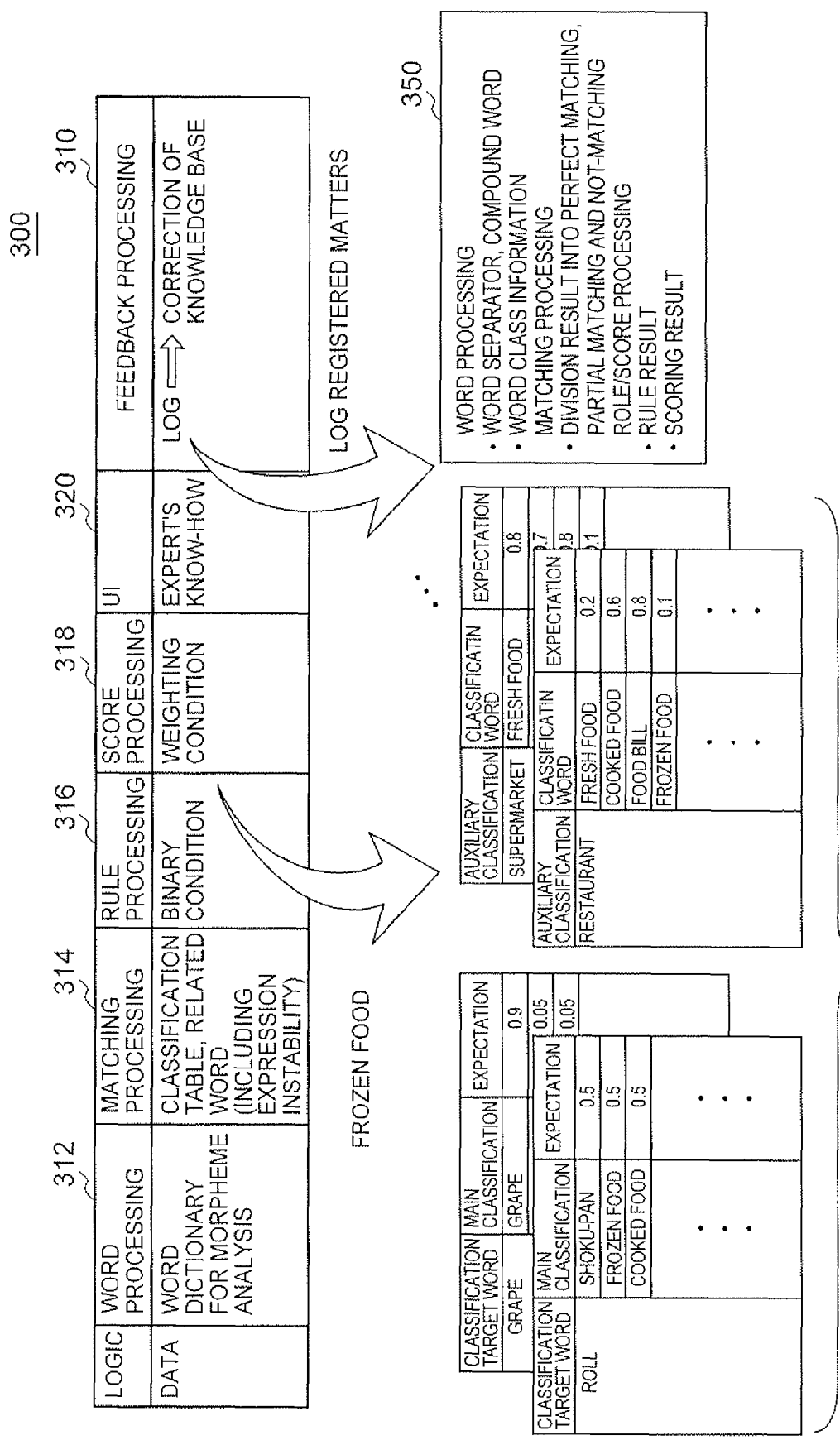
FIG. 3 schematically illustrates a processing sequence of the present embodiment and further illustrates one embodiment of the scoring and the log data that the log management section creates.

FIG. 3 schematically illustrates a processing sequence of the present embodiment and further illustrates one embodiment of the scoring and the log data 290 that the log management section 280 creates. The sequence of the information classification processing of FIG. 3 starts when a classification request and classification information are received. Upon receipt of the classification request, text data made up of the classification request is transmitted to the language analysis section 220, word processing 312 is applied to the text data, and morpheme analysis is executed. At this time, a system dictionary and a user dictionary that the user updates are applied as the word dictionary database, so as to conduct a division into the units of language elements that are optimum at the present time. At this time, the expression instability table, the higher/lower level concept table and the like are also used to improve the degree of matching with related words.

The generated word element is sent to the language element classification section 230 to execute the classification processing through matching processing 314 with the classification identification value. In the matching processing 314, a related word in which the word element is registered is retrieved while referring to the classification database 270. In this case, a word indicating the expression instability or the higher/lower level concept given by the word processing is also used as a search word. With respect to the search result, examination is conducted as to whether rule processing 316 using a binary condition is registered for the search word or not, and if the binary condition is found, the rule processing 316 using the binary condition is executed.

The rule using the binary condition in the present embodiment determines, for example, the classification result of keyword 2 based on a binary judgment of keyword 1 when the classification information is {keyword 1}+{postpositional particle}+{keyword 2}. More specifically, in the case where the classification information is "Okinawa no kamaboko" ("fish sausage of Okinawa" in English), a prefectural name in a household tag registered as an additional attribute is extracted with respect to keyword 1=Okinawa, where the prefectural name is set as the binary condition "prefecture @ household tag".

At this time, as for the classification information "Okinawa no kamaboko", a binary condition registered for keyword=kamaboko is firstly retrieved. In the case where a binary condition is set for the classification target word, when the binary condition is met, the result set in the binary condition table is selected with a higher priority as the automatic classification result. In the illustrated embodiment, since a binary condition is set for keyword=Okinawa with respect to keyword=kamaboko, binary condition=Okinawa returns the value of true. As a result, an automatic classification result registered corresponding to binary condition=prefecture @ household tab: Okinawa is returned for keyword=kamaboko. In this regard, the conventional binary condition judgment cannot assign the classification identification value designating "Age-kamaboko" ("fried fish sausage" in English) that is commonly distributed in Okinawa, simply when item name="kamaboko" is input as the classification information, and therefore a person who inputs the information has to refer to individual information separately to set binary condition=prefecture @ household tab: Okinawa using the binary condition setting or the like, which does not mean automatic classification that is realized by using a short sentence as the classification information. Note that according to the expert's know-how, classification information="Okinawa no kamaboko" and classification information="Okinawa de kamaboko" ("fish sausage at Okinawa" in English) are judged as classification information to which equivalent classification identification values are to be assigned. Thus, in the illustrated embodiment, when postpositional particle="no" and postpositional particle="de" are detected, the server 104 executes equivalent processing thereto.

In the case where a plurality of classification identification values are found in the rule processing 316, scoring processing 318 for scoring the classification values is applied. In the scoring processing 318 of the present embodiment, the language analysis section 220 and the language element classification section 230 apply different weighting processing for the case of perfect matching and the case of partial matching, respectively. The following describes such weighting processing.

Weighting Processing in the Case of Perfect Matching

In the case of the perfect matching of the classification information using the knowledge base 106 of the current configuration, the weighting processing applied to the classification identification value candidate is conducted by calculating a selection possibility by the analysis of the log data 290 and assigning the calculated selection possibility as the weighting value to the classification identification value candidate. This is because, in the case where the keyword constituting the classification information matches perfectly with consideration given to the expression instability and the higher/lower level concept, classification with sufficient accuracy can be expected statistically using the knowledge base 106 of the current configuration.

Weighting Processing in the Case of Partial Matching

In the case where only partial matching is obtained, the server 104 uses the correlativity of the classification identification value as a score value, and executes weighting processing for the extracted classification identification value. To this end, an occurrence table 340 is provided, which is for scoring a priority of the classification identification value candidate.

This occurrence table 340 includes, in association with auxiliary classification for registering shop types and service names, an expectation that a user or a general consumer do the act corresponding to each classification value, for the classification identification values as a whole. The occurrence table 340 has similar data configurations for all of the auxiliary classifications, where values of the expectations are different from those indicated by the auxiliary classification=restaurant, so that the relevance with the auxiliary classifications can be provided for all of the classification identification values.

Meanwhile, in the present embodiment, in the case where the classification information matches partially and a plurality of classification identification value candidates exist, the weighting has to be conducted with respect to data that the server 104 does not have. In this case, the server 104 calculates a correlation factor of a keyword that matches partially for each item of the main classification table or the auxiliary classification table, selects a high correlation factor because with such a high correlation factor, it is considered that the partially matching keyword correlates the most, and uses the same for weighting.

In a specific embodiment, the weighting processing for the partial matching is calculated using the following expression (1) based on the fact that a specific classification value has a higher correlativity with the classification information than other classification values.

Expression 1

$$\text{correlation factor} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

where in the above expression, $x_i$ denotes a data string of classifications corresponding to input data (classification configuration of weighting candidates), $y_i$ denotes a data string indicating the relevance of each classification with other classifications (relationship between one classification and another classification), $\bar{x}$ denotes arithmetic average of $x=\{x_i\}$, and $\bar{y}$ denotes arithmetic average of $y=\{y_i\}$.

In Expression 1, the classification that can be considered having the highest possibility is a "one classification" with the maximum correlation factor among correlation factors obtained by calculating the correlation factors between "classification configuration of weighting candidates" and "relationship between one classification and another classification", where the "relationship between one classification and another classification" is calculated for all classifications one by one. More specifically, assuming that a data string of expectations of a plurality of classifications obtained by a search using the classification information is $x_i$, and a data string of expectations of a plurality of classifications obtained by a search with respect to all classification words in the occurrence table 340 is $y_i$, a correlation factor is calculated using the arithmetic average of these, and the classification word giving the highest correlativity or the classification identification value having a correlativity exceeding a fixed threshold are registered as a classification candidate, whereby scoring is executed. This scoring enables the decision of the optimum candidate for the classification identification value when the server 104 generates partial matching only for the classification information, and the information for classification is short but a plurality of classification identification values exist, for example, among the relationships including keyword=restaurant, keyword=supermarket, keyword=Okinawa, keyword=grape, keyword=roll and the like, the decision as to what classification identification value should be as the optimum candidate becomes possible.

Using the above-stated processing, the server 104 schematically assigns a classification identification value to the classification information to execute automatic classification processing. On the other hand, the automatic classification processing by the server 104 using the classification database 270 currently set cannot cope with the diversity of the classification of the classification information, for example, regional characteristics, time period characteristics, specialties and the like, which are to be judged by an information classification expert user as the case where different classification identification values should be assigned, thus requiring the correction.

To this end, the present embodiment provides a UI 320, thus executing feedback processing 310 in which the correction from a user like an expert is received to correct and update the classification data in the classification database 270. When the data is updated, inquiry is made to the log management section 280 about classification data to be updated and corrected, a record, a field, a corrected value thereof, and the like, where the data registered in the log data 290 is used for reference. Referring to FIG. 3, data 350 registered as log data 290 is illustrated. The registered data 350 includes, for example, a history of language analysis such as a word separator, a compound word, a word class information in the language processing, a history of division into perfect matching, partial matching, and not-matching, a rule treatment such as a binary condition judgment result, a rule result in scoring processing, and a history of scoring processing. In the present embodiment, update target of the knowledge base is decided using the registered data 350, thus updating the knowledge base 106 evolutionally.

FIG. 4 illustrates one embodiment of a data structure 400 that the classification database 270 includes. As illustrated in FIG. 4, the classification database 270 includes a main classification table 410, an auxiliary classification table 420, and a binary condition table 430. The main classification table 410 has a data structure for associating a target of classification information, a classification word that identifies the target, and a classification value with each other. The main classification table 410 may include, with respect to a classification identification value including fields 412 and 414, a field 416 in which a classification target word such as an item name of a commodity, a service name of a service, a technical term of special technique classified by the classification identification value is registered. In the embodiment of FIG. 4, the classification words 412 are for execution of classification of foods as commodities, where fresh vegetable, cooked food, food bill, and frozen food are registered as the items of the foods.

As the classification values 414, classification codes AAA to DDD are registered. Note here that the classification information to be classified is not limited especially, and for example, any information can be a target for classification as long as information can be classified concerning the commodities such as carrot, tomato, sushi, steak, hamburger, or the like, services such as travel, fitness, drinking and eating, amusement and the like, and technical items. The classification values 414 are not limited especially, and they may be numerical codes, account codes, numerical/character compound codes such as International Patent Classification (IPC) and the like. The "information that can be classified" herein refers to a target to be classified in a specific embodiment. In other words, the "information that can be classified" may be a target for classification in a specific embodiment, but it may not be a target for classification in other embodiments but may be set as auxiliary classification. That is to say, the above-stated "information that can be classified" is such that, in a specific purpose, information as a target of the classification and information classified as auxiliary classification and not as the target of the classification form mutually exclusive categories.

The auxiliary classification table 420 has a data structure in which, for each semantic attribute such as a category including a commodity, a service, an account title, a technical feature or the like, a keyword to be classified is registered as a related word. The auxiliary classification table 420 has a function of associating a keyword of the classification information with a semantic attribute such as a shop that deals with the classification target, a service, a technical feature or the like. The auxiliary classification table 420 is configured as follows: the auxiliary classification table 420 includes a field 422 with auxiliary classification registered therein such as a shop or a service, and a field 424 with a keyword registered therein such as a shop that deals with the classification target, a service, a technical type or the like.

In the embodiment of FIG. 4, the restaurant indicates a meaning of the provided service, to which shop A, . . . shop E and the like are registered as related words, where shop A, . . . shop E are values to be identified as keywords making up the classification information or values to be set as binary conditions. Similarly, for each category of provided services such as supermarket, convenient store, travel, drinking and eating and fitness, a keyword, i.e., a value as related word, is associated therewith and registered.

As shown in FIG. 4, the classification database 270 further includes the binary condition table 430 with binary conditions registered therein. In the embodiment of FIG. 4, the binary condition table 430 includes a field 432 for registering an item name of a commodity such as "kamaboko" to which a binary condition is to be applied; a field 434 for registering a binary condition such as "prefecture @ household tab: Okinawa" that is applied to the item name; and a field 436 for registering a result value when the binary condition is satisfied. In the case where the classification information is "Okinawa de(no) kamaboko" ("fish sausage at (of) Okinawa" in English). "Okinawa" as the binary condition is true, and "kamaboko" returns true for the item name also, and therefore a result of the binary condition judgment is prioritized, and for example, "Age-kamaboko" registered in the field 436 is selected as the automatic classification result without executing the search in the main classification table 410.

Then, the server 104 retrieves a record including the selected "Age-kamaboko" as the classification target word in the main classification table 410, and decides a classification word and a classification value of the record with "Age-kamaboko" registered therein as a classification identification value about the classification information "Okinawa de kamaboko". Herein, as for a classification word and a classification value when an item name of a commodity is used as the classification target word, a value registered in a classification table for household accounts designated by the following URI of Ministry of Internal Affairs and Communications, Bureau of Statistics, http://www.stat.go.jp/data/kakei/koumoku/bun-rui.htm can be adopted. When the classification word and the classification value designated by the following URI of Ministry of Internal Affairs and Communications, Bureau of Statistics, http://www.stat.go.jp/data/kakei/koumoku/bun-rui.htm are adopted, a classification name=Age-kamaboko and a classification value=203 will be given for the classification information of "Okinawa de(no) kamaboko".

On the other hand, in the case where a binary condition of prefecture @ household tab: Okinawa is not set in the binary condition table 430 of FIG. 4, or in the case where the binary condition returns a value of false when the classification information is "Tokyo de kamaboko", then the search result in the main classification table 410 is returned as the automatic classification result as it is, so that a classification name=kamaboko and a classification value=205 corresponding to "kamaboko" will be given.

From the viewpoint of an expert, it is judged that the automatic classification result that assigns the classification value=205 to the classification information="Okinawa de(no) kamaboko" is not appropriate from the regional aspect. However, in the case where a binary condition corresponding to the binary condition table 430 is not registered for the automatic classification processing by the server 104, "Age-kamaboko" with the classification value=203 can be classified only when "Age-kamaboko" is directly input as the classification information. On the other hand, even when classification information="Okinawa de(no) kamaboko" is input, the classification value=203 will not be assigned unless the expert user's know-how is reflected on the binary condition.

Further, also in the case where classification information="Shop B de hamburger" ("hamburger at shop B" in English) is input, such classification information="Shop B de hamburger" does not provide accurate automatic classification result unless "Shop B" is registered as a related word in the auxiliary classification table 420, because the auxiliary classification is considered as not-classified.

The present embodiment, as described above, provides the information classification system 100 that improves classification accuracy in which the knowledge base is updated evolutionally using the expert user's know-how so that proper information classification by the expert user can be given. To this end, the information classification system 100 presents a classification confirmation GUI showing a classification identification value that the server 104 automatically assigns on a desktop screen of the client 102 that the expert user operates, so as to allow the expert user to judge the correctness as to the assignment of the classification word="kamaboko" and the classification value=205 for the classification information "Okinawa de kamaboko".

In the case where the automatic classification result by the server 104 is not proper in view of the expert know-how, the information classification system 100 prompts the expert user to input proper classification information using the classification confirmation GUI. When the expert user inputs proper classification information, then the server 104 receives the input value, and judges a data structure to be corrected by searching the log data 290, so as to reflect it on the knowledge base.

Figure 5:
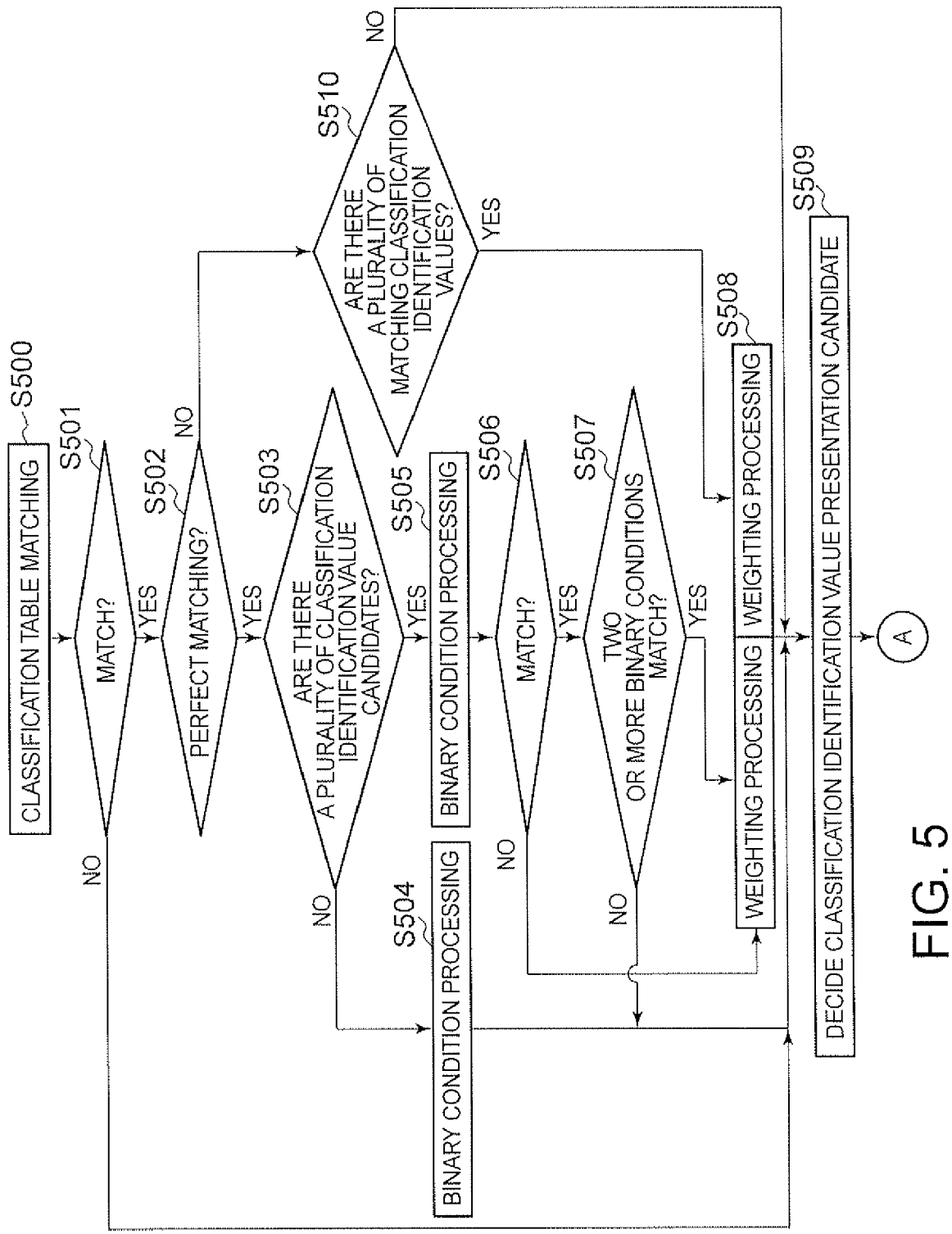
FIG. 5 is a flowchart of one embodiment of the classification identification value decision processing that the information classification system executes.

FIG. 5 is a flowchart of one embodiment of the classification identification value decision processing that the server 104 executes. The processing starts with Step S500, where the classification information is acquired and matching processing is conducted using various classification tables. At Step S501, the language analysis section 220 executes the matching of keywords included in the classification information with consideration given to the expression instability and higher/lower level concepts using the word dictionary database. Thereafter, a result of the language analysis section 220 is passed to the language element classification section 230, where the matching of the classification information with the main classification table 410 and the auxiliary classification table 420 of FIG. 4 is judged. If the keywords included in the classification information match at Step S501 (yes), the type of the matching is further judged at Step S502 to judge whether it is perfect matching or partial matching.

If it is judged as perfect matching at Step S502 (yes), further judgment is made at Step S503 as to whether a plurality of classification identification value candidates are extracted or not. If a plurality of classification identification values are extracted (yes), the binary condition table 430 of FIG. 4 is referred to execute the binary condition processing at Step S505. At Step S506, judgment is conducted as to whether the binary condition is satisfied or not. If the binary condition is satisfied (yes), at Step S507 judgment is further made as to whether two or more classification identification value candidates satisfying the binary condition are extracted or not. If two or more classification identification value candidates satisfying the binary condition are extracted at the judgment of Step S507 (yes), at Step S508 the weighting condition processing in the case of perfect matching is applied so as to conduct the scoring of the classification identification value candidates, which are registered together with the score values in an appropriate storage region.

Thereafter, at Step 509 the classification candidate extraction section 240 decides the classification identification value with the highest score value as a candidate for presenting a classification identification value, and extracts the same. This is because since there is a possibility that a plurality of candidates have the same score value, the number of the extracted classification identification values is not always one. Thereafter, the information classification system 100 proceeds to the classification confirmation processing for confirming the classification candidate via point A.

On the other hand, if items matching with the keywords included in the classification information are not found by the language analysis with consideration given to the expression instability and higher/lower level concepts at Step S501 (no), the processing branches to Step S509, thus proceeding to the classification confirmation processing from point A with the classification identification value being not decided. If it is judged as not being perfect matching at Step S502 (no), at Step S510 judgment is made as to whether there are a plurality of matching classification identification values or not. If it is judged that there are a plurality of matching classification identification values at Step S510 (yes), the processing goes to Step S508, where the weighting processing is executed while applying the weighting condition processing in the case of partial matching thereto, and at Step S509 classification identification values are decided, thus proceeding to the classification confirmation processing via point A.

If there is only one classification identification value candidate at Step S503 (no) where it is examined whether there are a plurality of classification identification value candidates or not, binary condition processing is executed at Step S504, and the classification identification value is decided at Step S509 based on the result of the binary condition judgment of the keywords included in the classification information, thus proceeding to the classification confirmation processing via point A. If matching with the binary condition is not found at Step S506 (no), the processing proceeds to Step S508, where the same processing as that for the perfect matching and two or more binary conditions being satisfied is executed.

Thereafter, at Step S509 the classification candidate extraction section 240 decides classification identification values by selecting three candidates in the descending order from the selected single classification identification value or a plurality of classification identification values, for example, thus proceeding to the classification confirmation processing via point A. If there is no classification candidate matching with the binary condition, and a classification identification value is extracted uniquely at Step S507 (no), the processing branches to Step S509 so as to make a decision of the classification identification value, and then proceeds to the classification confirmation processing via point A.

As a result of the above-stated processing for deciding classification identification values, in the case where a classification identification value is decided uniquely including the case of not-decided, partial matching or perfect matching, classification processing is executed for the case where decision is made by the weighting processing.

Figure 6:
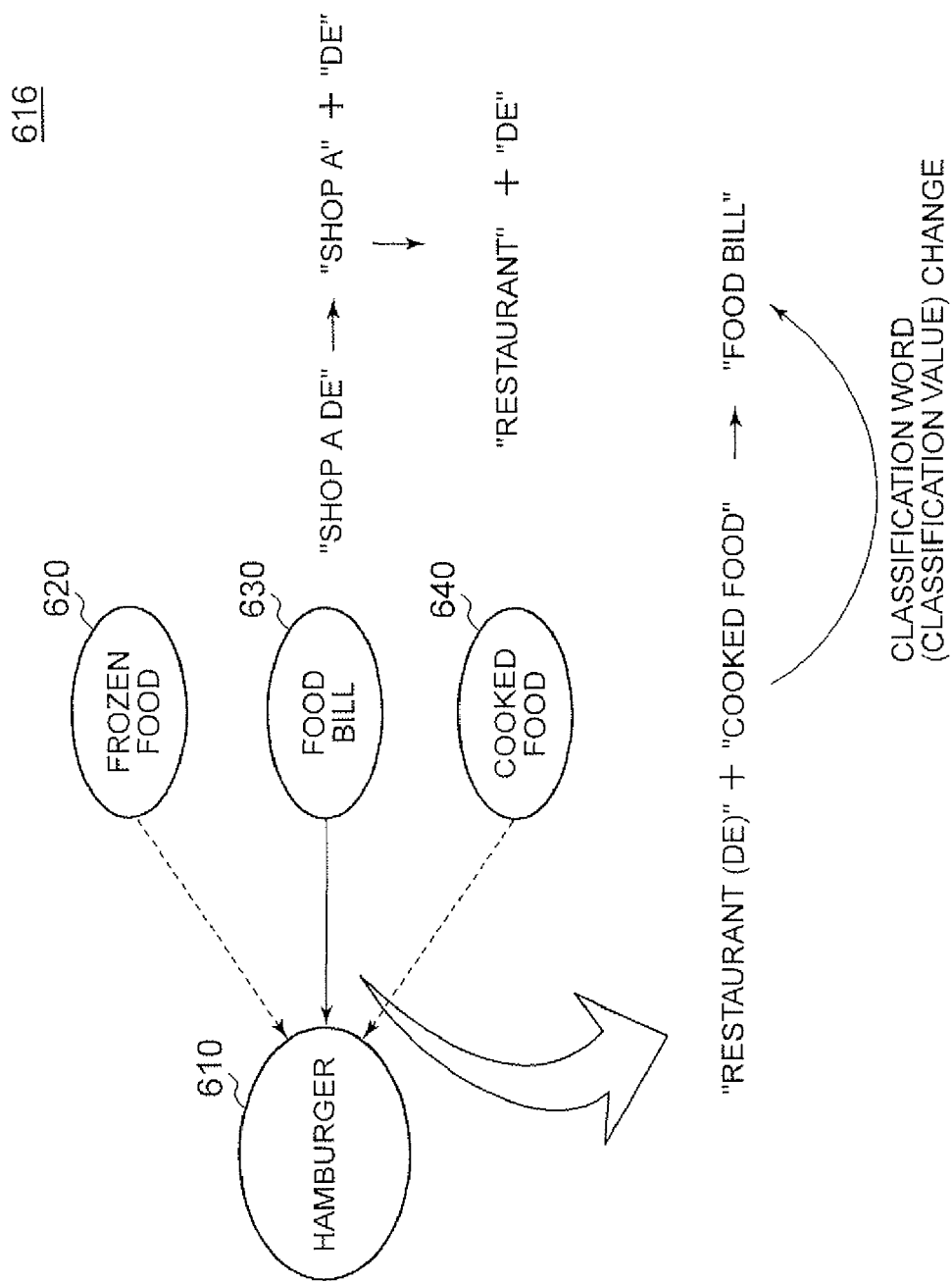
FIG. 6 graphically illustrates decision processing for the classification identification value decision described with reference to FIG. 5.

FIG. 6 graphically illustrates decision processing 600 for the classification identification value decision described with reference to FIG. 5. As illustrated in FIG. 6, a commodity 610 such as "hamburger" is set as a classification target word that is registered in a plurality of classification word records such as frozen food 620, food bill 630, cooked food 640 and the like, with reference to the main classification table 410 of FIG. 4. Thus, if only the commodity "hamburger" is input as the classification information, the frozen food 620, the food bill 630, and the cooked food 640 as classification target words will be extracted as classification candidates, and therefore the classification accuracy is not sufficient for the information classification system 100. Further, with this level of classification accuracy, the classification accuracy at a reasonable level for introduction of the expert's know-how is not given, so that the updating level of the knowledge base remains low.

In the present embodiment, the classification information is expanded to a short sentence rather than the units of words, thus enabling the introduction of semantics into the classification processing, and improving the classification accuracy remarkably. As a result, the present embodiment provides the classification accuracy at a degree enabling the know-how registration at an expert level. This will be described below in detail with reference to FIG. 6. In the embodiment of FIG. 6, in the case where "hamburger" alone is input as the classification information, the automatic classification using the main classification table 410 of FIG. 4 does not progress after frozen food DDD, food bill CCC, and cooked food BBB are given. Thus, unless any further condition is added thereto, further know-how cannot be taken out or if it can be taken out, lower level of know-how only can be induced even when an expert user examines the result of the automatic classification.

In the embodiment of FIG. 6, the classification information is input as "Shop A de hamburger", whereby a further sophisticated expert's know-how can be extracted inductively, thus enabling higher degree of evolutional updating of the knowledge base. That is, in the information classification system 100 of the present embodiment, when the classification information of "Shop A de hamburger" is received, language analysis is conducted for "Shop A"+"de"+"hamburger". Herein, in the present embodiment, in the case where "Shop A" is decided to be a related word registered in a record of restaurants by referring to the auxiliary classification table 410, it becomes possible to take out the expert user's know-how so as to, assuming that related word "restaurant" registered in the auxiliary classification table 420, the Japanese postpositional particle "de" and "cooked food" are binary conditions, let the expert set the result thereof as "food bill". Since the result of the judgment processing using the set binary conditions returns true, the result of the binary condition judgment is extracted with a higher priority than the search processing of the classification target words, and therefore it becomes possible to assign the classification word="food bill", and the classification value=CCC to the classification information "Shop A de hamburger".

The binary condition is corrected and set through the classification confirmation by the expert user, whereby the classification identification values of "food bill" and "CCC" are set for "Shop A de hamburger" with a higher priority in the following information classification. The description has been given by illustrating a general item name of "hamburger" for convenience of explanation. However, as for more specialized classification information, the classification accuracy can also be improved remarkably by inputting the classification information in a short sentence, thus making it easy to induce the know-how extraction from the expert.

Figure 7:
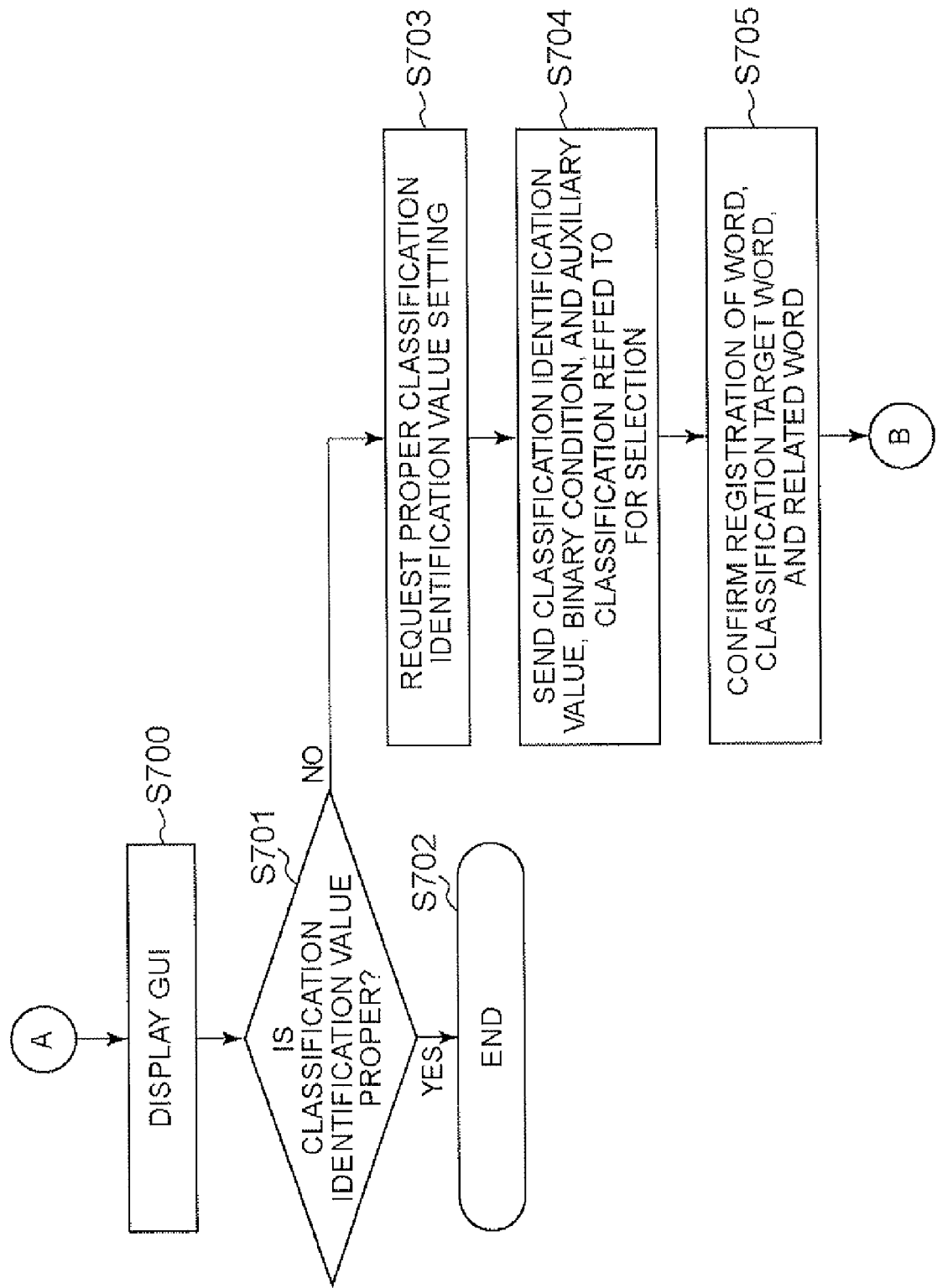
FIG. 7 is a flowchart of one embodiment of classification confirmation processing executed by the classification update section that takes over the processing via point A of FIG. 5, with regard to the classification candidates extracted by the classification candidate extraction section.

FIG. 7 is a flowchart of one embodiment of the classification confirmation processing executed by the classification update section 250 after entering from point A of FIG. 5, with regard to the classification candidates extracted by the classification candidate extraction section 240. The classification update section 250 creates a form for classification confirmation using a structured document such as HTML or XML or the like, thus filling the respective values of the extracted classification candidates in the form. The information classification system 100 sends the form created at Step S700 to the client 102 so as to make a classification confirmation GUI generate on a desktop screen of the client 102. Herein, in the distributed computing environment using the client/server system, similar processing can be executed using a dedicated client program and a server program. In the following description, it is assumed that the server 104 is implemented as a web server for convenience of explanation.

At Step S701, the classification update section 250 judges a result of the classification confirmation that the client 102 sends, so as to make judgment as to whether data is received via the form with no correction of the classification identification value or not. If the form is returned with no correction of the classification identification value and the classification condition, more specifically if the user judges that the classification identification value is proper (yes), the classification update section 250 notifies the classification candidate extraction section 240 of the currently extracted classification identification value as a valid value, so as to allow the classification identification value to be used for the following processing, and making the processing end at Step S702.

On the other hand, at Step S701, if a corrected value is returned with the classification identification value and the classification condition being corrected, that is, it is judged that the classification information is not valid (no), the processing branches to Step S703, where a request is issued to the classification candidate extraction section 240 so as to set a proper classification identification value, and update the extracted classification candidate identification value as log data. Thereafter, at Step S704, the classification update section 250 receives data that the user inputs such as the classification identification value, binary condition, auxiliary classification and the like via a form, and registers the same in the log data 290. Thereafter, at Step S705, a value of the filed corresponding to the data structure relating to the change is acquired, which is notified the classification update section 250. Then, the registration of the current word, classification target word, related word and the like is confirmed with the acquired classification identification value, and that processing is described in the log data 290.

At the stage where such processing has been completed, the classification update section 250 issues a notification to the word dictionary database 260 and classification database 270 of the knowledge base from point B, thus making the processing proceed to the updating processing of the knowledge base using the log data. The log management section 280 generates log data in which a judgment history of the decision processing for the classification value decision processing, the values prior to the correction, and the values after the correction are registered so as to allow the correction designation to be judged for the correction of the classification identification value and the correction of a reference value of the binary condition, which will be used for the correction of the classification identification value, and reference values of the binary condition.

FIG. 8 illustrates one embodiment of a classification confirmation GUI 800 that the classification update section 250 displays on the client 102 in the present embodiment. When the server 104 is configured as a web server, the classification updating GUI 800 of FIG. 8 is sent to the client 102 as a form, and then corrected data is sent from the client 102 to the server 104 using GET method or POST method. When distributed computing environment such as CORBA is used, display on the client 102 is realized using a window class or window method of C++, Java® or the like, thus allowing the corrected data to be sent to the server.

The classification confirmation GUI 800 includes a field 810 that displays classification information that the client 102 sends or the classification information that the classification information readout apparatus 110 acquires; a field 820 that displays a result of automatic classification processing that the server 104 executes; and a field 830 that displays reference information that is used for the automatic classification. When recognizing the classification confirmation GUI 800 of FIG. 8, the user confirms that the classification information is "Shop A de hamburger", and information such as price, quantity, unit, and region is registered as additional attributes. The server 104 executes information classification processing using the respective values displayed in the field 810, and makes an automatic classification result generated as a result displayed on the field 820. As shown in FIG. 8, the classification identification value given by the current set knowledge base 106 is "food bill (CCC)". The field 830 displays the reference information that is used for the automatic classification.

The reference information displayed in the field 830 includes classification, related words, classification target objects and the like relating to the classification information in the order of the score values in the automatic classification or using the order of registration of the classification identification values. In the field 830, "restaurant", which is an auxiliary classification name acquired from the auxiliary classification table 420 by the language analysis of Shop A, and "hamburger" are applied as binary conditions, thus resulting in the food bill (CCC) as the estimated classification identification value, which is displayed as the automatic classification result.

Meanwhile, in the lower area of the classification confirmation GUI 800, a GUI for, when the expert user judges that the automatic classification result is not proper for the classification information "Shop A de hamburger", giving a proper classification identification value is provided as pull-down menus 840 and 850 in the illustrated embodiment. The pull-down menu 840 is for correcting the classification identification value. In the case where the automatic classification result in the field 820 has to be corrected based on the expert's know-how, a user having authority to correct the automatic classification result, e.g., an expert user operates a cursor bar in the pull-down menu 840 to register more proper classification identification value.

The pull-down menu 850 is for registering a new auxiliary classification for "Shop A" or for new registration if a commodity such as "hamburger" or a service has not been registered. In the case where "Shop A" and a classification target word are not registered in the knowledge base, the automatic classification result displays "not-classified", for example. Then the user can set a proper semantic attribute value and classification target value from the pull-down menu 850. If the automatic classification result is proper or after proper values for the correction of the classification identification value, the semantic attribute of the related word, and the classification target word are registered, the user clicks a confirmation button 860, and sends the confirmation contents to the server 104. In the case where the user judges that another binary condition has to be corrected, the user may click a binary condition correction button 870 in FIG. 8 and execute the detailed correction of the binary condition.

FIG. 9 illustrates another embodiment for the classification confirmation GUI that is displayed when the user judges that the binary condition has to be corrected in FIG. 8 and clicks the binary condition correction button 870. In the case where the user judges that a new binary condition has to be added for proper classification of the classification information, a binary condition setting GUI 900 is displayed. The binary condition setting GUI 900 is described below in a specific embodiment for the case where the classification information is "Oyaki" that relates to a food. A field 910 is for displaying the classification information used for the automatic classification. For the explanation purpose, the following describes the case where "Oyaki" is input as an item name, "Kyoto" is a regional attribute as an additional attribute, and "Cho" is a unit of counting.

In the case where the classification target word is "Oyaki", it will be classified by the automatic classification as a general "Oyaki" made of flour and other ingredients based on the current set knowledge base 106, resulting in the classification as in classification word=other foods, and classification value=FFF in a field 920. On the other hand, according to the expert, when the regional attribute is "Kyoto" and the item name as the classification target word is "Oyaki", and since its unit of counting is "Cho", it is judged as purchasing tofu instead of a general "Oyaki" made of flour and other ingredients.

In this case, the user has the binary condition setting GUI 900 displayed and inputs a proper classification. The correction is conducted by setting the item name=tofu in a field 930, and setting an additional attribute to be referred to as a binary condition in a field 940. Thereafter, the user clicks an OK button 950, thus sending the corrected contents to the server 104 and enabling the updating of the knowledge base 106. In the following processing, in the case where the item name=tofu and the additional information contains "Cho" and "Kyoto", then the classification word=tofu and the classification value=GGG are given as the classification information, so that the classification result with the expert's know-how reflected thereon can be given.

The server 104 compares each of the received values with the transmitted values. When the server 104 detects a value or condition that is different between each of the received valued and the transmitted values, the server examines the log data to acquire the data structure and the correction target address corresponding to the changed value, and has the correction by the user reflected on the knowledge base. Thus, for each history of the classification processing, the information to be acquired from the expert user will be different, and the correction target also will be different. In order to extract the know-how from the expert user effectively and allow the know-how to be reflected on the adequate data structure, the server 104 uses an automatic classification policy to manage the information to be acquired and the correction target.

FIG. 10 illustrates a table indicating an automatic classification policy 1000 enabling the automatic classification by referring to the log data 290 and the reflection of the correction on the knowledge base 106. The automatic classification policy 1000 of FIG. 10 is used for, when the result of the automatic classification is displayed to the client 102, designating a form including an input field for prompting the correction of a value to be filled therein.

FIG. 10 illustrates the automatic classification policy 1000 in the form of a table for the convenience of explanation. However, the server 104 of the present embodiment may include the automatic classification policy 1000 of FIG. 10 registered therein as a lookup table, or the automatic classification policy 1000 of FIG. 10 may be described as a program code in a program for the classification updating processing in the information classification, and their implementation method is not limited especially. Note that the automatic classification policy 1000 is registered in a lookup table format, whereby conditions can be changed or judgment conditions can be added without the need for the correction of a main processing program.

In the automatic classification policy 1000 of FIG. 10, a plurality of fields are registered. The following describes an entry item of each field.

(a) Field 1010 is for registering a condition concerning language processing. The field 1010 includes a condition for specifying the following processing policy as a flag or the like, depending on whether keywords included in the classification information can be analyzed by the morpheme analysis of the word dictionary database 260 or not.

(b) Field 1020 is for registering a condition in the matching processing. The field 1020 includes the matching status in the data structure 400 concerning their related words and classification target words with consideration given to the expression instability also, which is used for judging items to be corrected.

(c) Field 1030 is for registering a matching pattern in the matching processing. More specifically, it is expected in the field 1030 that the perfect matching includes the cases of single candidate classification and multiple candidates to be extracted. The field 1030 is for executing different correction processing in accordance with each matching pattern.

(d) Field 1040 is for registering a rule processing condition such as binary condition setting. The rule processing includes executing different correction processing depending on the absence or not of a binary condition or not or when binary condition judgment returns false or true.

(e) Field 1050 is for setting a possibility that the correction of the scoring processing is required, which deals with the case where the correction for weighting applied to the scoring processing is required. Herein, a null field in the field 1050 means the case where there is no need to consider the weighting.

(f) Field 1060 is for registering the necessity for the reflection of a user's, especially an expert user's know-how. In the field 1060, a data item enabling the change of a setting value by the user is set as a flag or the like, thus allowing the selection of a corresponding form or the like. In the case where language analysis totally fails, to further take in the user's know-how is not adequate at that time, and therefore a person who inputs the classification information instead of the expert user may input the information in order to expand the data of the knowledge base 106 itself irrespective of the expert's know-how. Even in this case, the input with the expert user's know-how reflected thereon is enabled.

(g) Field 1070 is for registering data enabling the selection of the classification confirmation GUI 800 including a correction input field for correcting a classification identification value to be extracted as the classification result depending on which one between a proper answer rate and a grading rate is prioritized. For instance, in the case where a result of the perfect matching is obtained including the expression instability in the language analysis, the proper answer rate given by the correctness of the keyword classification or the binary condition is prioritized. In the case where "grading" is indicated by the priority automatic classification policy, when the keyword shows partial matching, the grating of the classification target words using a correlation factor is prioritized.

(h) Field 1080 is for registering a correction target in the knowledge base in which correction is to be reflected in association with items registered in the fields 1010 to 1070. The classification confirmation GUI 800 includes an input field formed therein, which is for receiving an input value corresponding to the correction target registered in this field 1080, thus enabling the reception of the corresponding input data via the client 102. The classification information can be input also using the above-stated classification information readout apparatus 110, and the input format is not limited especially.

Figure 11:
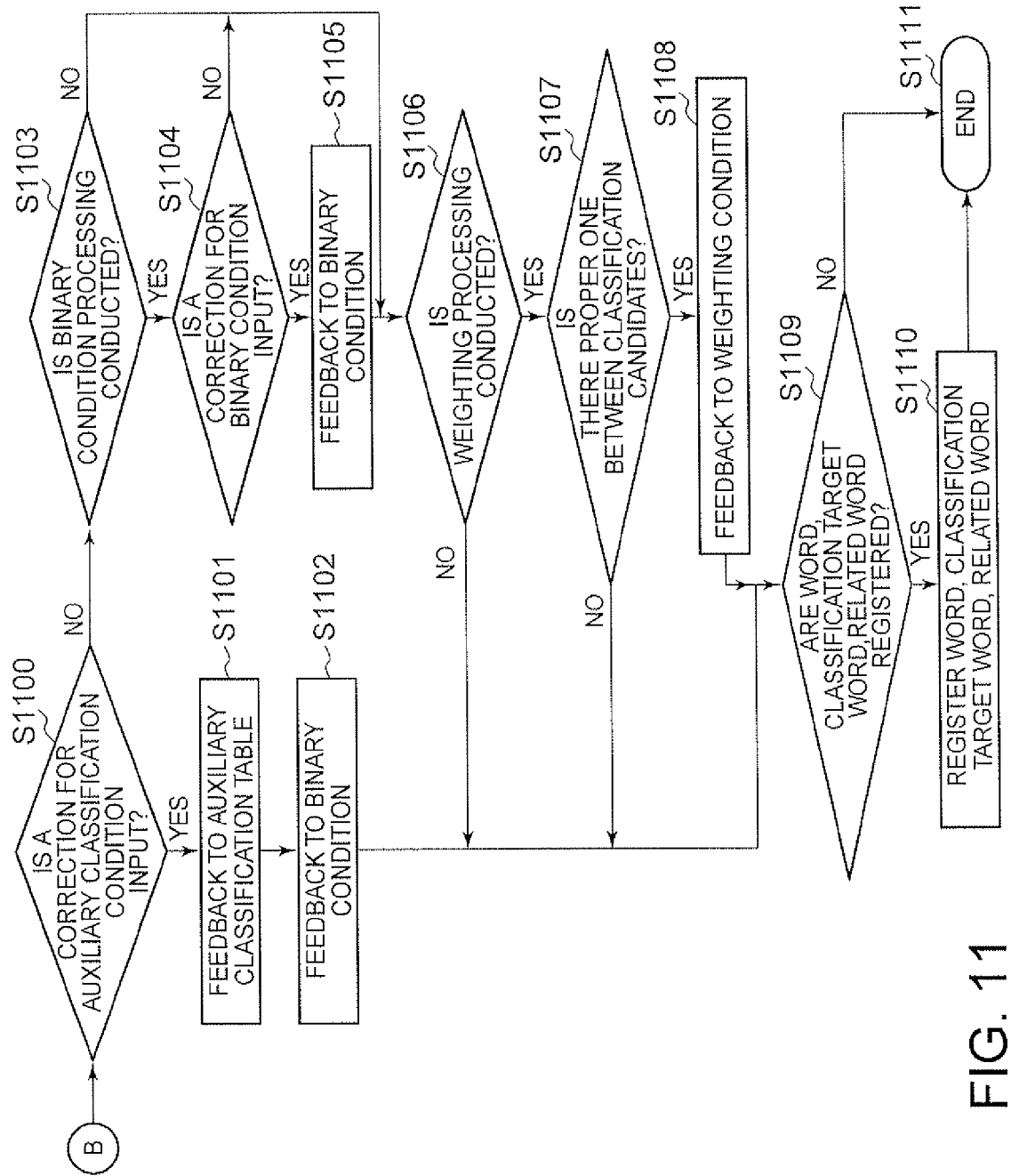
FIG. 11 is a flowchart of one embodiment of the classification updating processing, which starts via point B of FIG. 7.

FIG. 11 is a flowchart of one embodiment of the classification updating processing, which starts with point B of FIG. 7. In the classification updating processing, at Step S100, judgment is made by referring to the log data as to whether the user inputs an auxiliary classification condition or not. If the auxiliary classification condition is not corrected (no), the processing branches to Step S1103. On the other hand, if it is judged that there is a correction input for the auxiliary classification condition at Step S1100 (yes), at Step S1101 a value of the corresponding correction target address in the auxiliary classification table is corrected using the auxiliary classification condition after correction to feedback the user's input. Thereafter, at Step S1102, the binary condition table 430 corresponding to the corrected auxiliary classification item is corrected and the processing proceeds to Step S1109.

If it is judged that there is no correction input for the auxiliary classification condition at Step S1100 (no), then at Step S1103 judgment is made by referring to the log data 290 as to whether the binary condition processing is conducted or not. If the binary condition processing is conducted (yes), at Step S1104 judgment is made as to whether the user inputs the correction of the binary condition or not. If it is judged that the user inputs the correction of the binary condition at Step S1104 (yes), at Step S105 the corresponding correction target address in the binary condition table 430 is acquired for correction so as to conduct the feedback with the correction value by the user. Then, at Step S106 judgment is made as to whether the weighting condition processing is conducted or not. If the binary condition is not input at Step S1104 (no) and if the binary condition correction is not input at Step S1103 (no), judgment at Step S1106 is made as to whether the weighting condition processing is conducted or not.

At Step S1106, judgment is made by referring to the log data 290 as to whether the weighting condition processing is conducted or not in the automatic classification processing. If the weighting condition processing is conducted (yes), at Step S1107 judgment is made as to whether the classification candidates are not corrected and the classification candidates include a proper answer or not. At Step S1107, if the classification candidates include a proper answer (yes), at Step S1108 a correction target address of the corresponding weighting condition is referred to so as to conduct the feedback of the weighting condition with the weighting condition by the user's input. At Step S1109, judgment is made as to whether a word, a classification target word, and a related word are to be registered or not. At Step S1106 or Step S1107, if the judgment returns a negative result (no), the processing branches to Step S1109, thus executing the judgment concerning related word registration. If the word, the classification target word, and the related word are to be registered at Step S1109 (yes), the word is registered in the word dictionary, the classification target word is registered in the main classification table and the related word is registered in the auxiliary classification table at Step S1110, and the processing ends at Step S1111. If it is judged that the related word is not to be registered at Step S1109 (no), the processing ends at Step S1100 without registering the word, the classification target word, and the related word.

The embodiment of the classification updating processing of FIG. 11 enables the effective reflection of the correction value transmitted from the client 102 on the correction of the auxiliary classification table 420 and the binary condition table 430 by referring to the log data 290. The procedure of the classification updating processing of FIG. 11 is also applicable to, when a new classification target word in addition to a related word is input, the updating of the knowledge base with the new classification target word.

Referring now to FIG. 12, one embodiment of correction reflection processing 1200 of the classification table 400 included in the classification database 270 at a level of a data structure is described below. The classification database 270 in the information classification system 100 currently includes, with respect to the item name=kamaboko, a value indicated by a current classification state 1210 including additional attributes. The current classification state 1210 includes household information dealt with as additional information and a classification item that is data relating to the classification words.

When the classification information given is "kamaboko", the automatic classification result using the current classification state 1210 is set as default that gives the classification result of classification name=kamaboko and classification value="HHH" independent of the other conditions. It is assumed that the expert user corrects the classification value from "HHH" to "HHI" using his/her know-how, which is received by the server 104.

Upon receipt of binary condition correction, the server 104 receives a designation value to be a new binary condition, acquires a value of "Okinawa" registered in the "region" field of the fields in a classification table 1220, and registers the same in a new field of the binary condition table 430, thus generating a binary condition. At the same time, the server 104 sets the value of the automatic classification result in the result field as in from the current set "HHH" to a value "HHI" that the user sets in response to the correction. The correctable item is not limited especially, and setting is possible for all fields in the current set state 1220 as a target. Alternatively, as illustrated in FIG. 12, setting can be such that a designated additional attribute only can be corrected in accordance with the properties of the classification information. When the same correction has been conducted by the expert user N times, such correction may be reflected on the condition setting change.

On the other hand, a current classification state 1230 includes data registered, which relates to an item name of the same commodity or the like but is different in region, household member, income and the like. As for the current classification state 1230, "HHH" is a proper automatic classification result. In this case, the server 104 can compare the registered items between the current classification state 1210 and the current classification state 1230 for correction, using the classification confirmation GUI 800. For instance, the classification table 1240 includes records with different conditions specifying the name of the commodity="kamaboko". The information classification system 100 may extract the entry items with the same item name registered in the classification table 400 as a reference condition state 1240 in the binary condition correction GUI 900 and make the same displayed together with the binary condition setting GUI 800.

In this case, as for the reference condition state 1240 presented as the reference information on the binary condition setting GUI 900, as illustrated in FIG. 12, the fields about the same item name but having different values, such as "household type" in a field 1250, "income" in a field 1260, and "price" in a field 1270, are markup-displayed as correction candidates, for prompting the correction by the user. These correction items are sent to the server 104, and correction for each item is reflected, which is then reflected on the classification database 270. The correction processing of FIG. 12 may be conducted by providing a GUI dedicated to the classification table editing, instead of using the classification confirmation GUI 800 and the binary condition correction GUI 900.

FIG. 13 illustrates another embodiment in which the server 104 corrects an automatic classification result by a method different from the binary condition correction, indicating a specific example using the classification information "Shop F de raisin butter roll". In FIG. 13, the automatic classification result is corrected using weighting processing executed in accordance with the partial matching of keywords. In the embodiment of FIG. 13, "raisin butter roll" as the classification target word, for example, is a compound word including a plurality of morpheme keywords, "raisin", "butter", and "roll". Then, the respective morpheme keywords are independently regarded as classification target words, to which independent classification values are assigned.

Figure 13A:
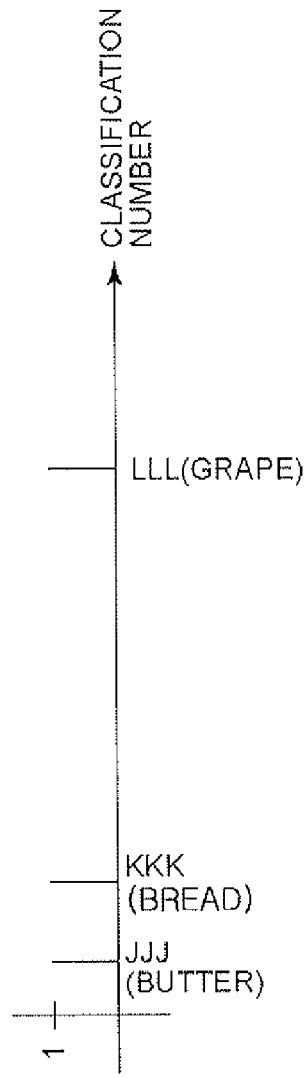
FIGS. 13(a) and 13(b), illustrates another embodiment in which the server corrects an automatic classification result by a method different from the binary condition correction, indicating a specific example using the classification information "Shop F de raisin butter roll".
Figure 13B:
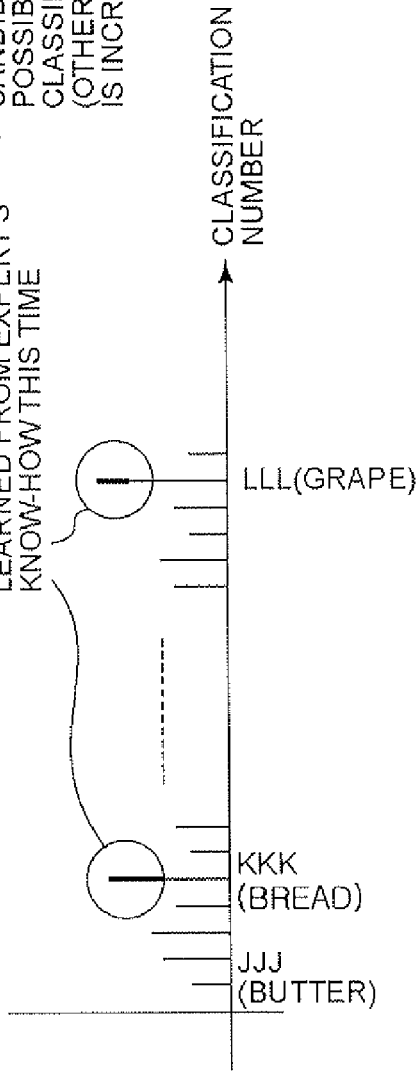

FIG. 13(a) illustrates an embodiment of weighting before correcting the weighting, and FIG. 13(b) illustrates an embodiment in which the weighting has been corrected based on the designation by the user. In the current set knowledge base 106 as shown in FIG. 13(a), the keyword=shop F is classified as a single semantic attribute as indicated in the auxiliary classification table 420 of FIG. 4, to which the binary condition is not set. Meanwhile, since the keyword="raisin butter bread" is a compound word, it gives sub-keywords of "raisin", "butter" and "bread".

The language analysis adopts morpheme analysis and returns a value of a hit also for the partial matching between a keyword, a related word, and auxiliary classification, and therefore all of them can be selected as classification candidates. Meanwhile, as for the classification name, it is more appropriate, according to the expert's know-how, to assign a classification name of "other breads" instead of a classification name "bread" to "raisin butter roll". Thus, the expert user is required to correct the current classification identification value=bread to a proper classification identification value=other breads.

Upon receiving the correction from the expert user, the server 104 confirms the log data 290. As a result, in the case where there are sub-keywords and any one of the sub-keywords is designated as a reference condition, the server 104 corrects the correlation factor instead of the setting processing of the binary condition to increase the rank of the classification identification value=other breads, thus causing the classification candidate extraction section 240 extract the same. The corrected reference condition value is used for updating the weighting condition table for the weighting processing. The weighting condition table is, as shown in FIG. 13, set as constant values assigned to the respective classification identification values in the default setting. Then, in the present embodiment, in the case where sub-keywords included in a compound word are dealt with, for example, constants of the classification identification values corresponding to the reference condition are updated by multiplying multipliers so that the weighting is increased when the keyword thereof corresponds to the reference condition, thus allowing the correction for the reference condition to be reflected.

When the server 104 finds sub-keywords in the classification information, the server 104 registers the existence of the sub-keywords in the log data 290. Then, the server 104 lets the sub-keywords displayed as the reference information of the classification confirmation GUI 800. The expert user designates the sub-keywords as the reference condition, and sends the same to the server 104. When the server 104 detects the correction of the reference condition and judges that the correction of the reference condition designates a sub-keyword, the server 104 increase the weighting of the selected sub-keyword as shown in FIG. 13(b), and sets the extraction so as to use the correlation factor rather than the selection possibility. As a result, the correlation factor for the case where the partial matching is obtained for the sub-keyword included in the compound word can be increased and the weighting relating to the corresponding classification identification value can be increased, thus giving a high correlativity to a specific classification identification value.

In the embodiment of FIG. 13, when "bread" and "raisin" among sub-keywords are concurrently extracted as the classification candidates, the expert user refers to the classification information and multiplies the weighting factors set beforehand for the keyword by a sufficient large correction factor, so that the correlation factor for the classification identification value="other breads" is increased for the "raisin butter roll". As a result, in the case of the classification information "Shop F de raisin butter roll", it can be set that the classification identification value for "other breads" is automatically classified as the classification candidates for the keyword=raisin butter roll, rather than other classification identification values.

FIG. 14 illustrates an embodiment of a corrected classification table 1400 used when the information classification system 100 of the present embodiment corrects the classification database 270 with the setting by a user, especially by an expert user reflected thereon. In the embodiment of FIG. 14, correction is not made in fields 1402, 1404 and 1406 in a main classification table 1410, but correction is reflected on an auxiliary classification table 1420 and a binary condition table 1430.

In the following description, it is assumed that "Shop NEW de hamburger" is input as classification information. The Shop NEW is not registered as a related word in an auxiliary classification table 420 before correction, resulting in that the automatic classification result will be as in classification name=cooked food and classification value=BBB as a top classification candidate, which is the case of partial matching.

In this case, the server 104 displays "not-classified" or "null section" for the auxiliary classification value corresponding to the semantic attribute about the Shop NEW in the classification confirmation GUI 800. When recognizing this display, the expert user inputs a proper auxiliary classification value in the "not-classified" or "null section" field, e.g., "restaurant", "supermarket", "convenience store" or the like, further corrects the sections to be corrected such as a binary condition, and sends the same to the server 104.

When receiving the correction, the server 104 recognizes the correction target using the processing of FIG. 11 while referring to the log data 290, and registers the related word "Shop NEW" in the auxiliary classification table 420. The server 104 then registers "restaurant" and "cooked food" as binary conditions similarly to the case of Shop A because the Shop NEW is a restaurant in the illustrated embodiment, and assigns the sent food bill (CCC) as the judgment result. The assigned binary condition is added in a subsequent record for the binary condition of "kamaboko" in the binary condition table 1430, which is used for the automatic classification processing after the correction.

Figures 15A, 15B:
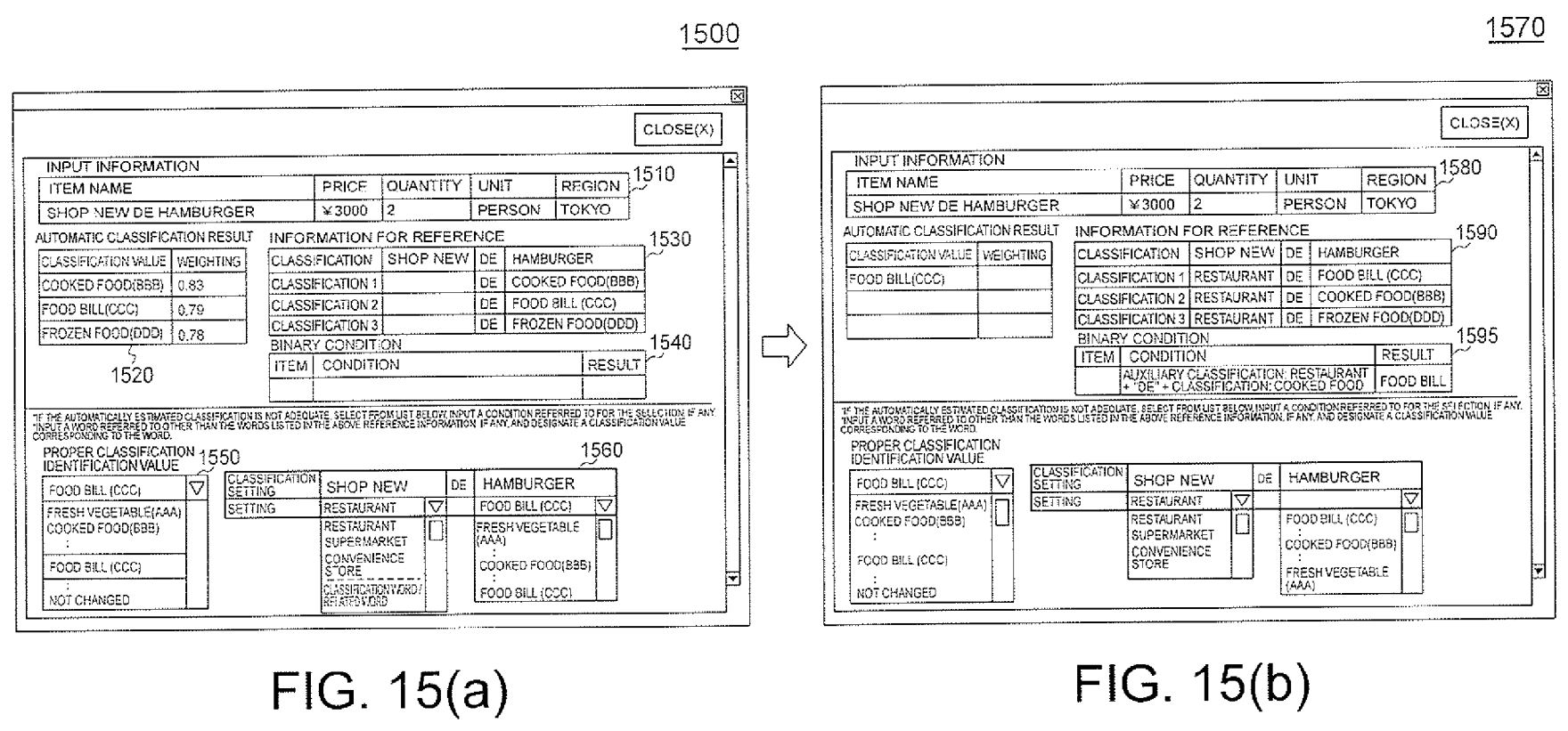

FIG. 15 illustrates one embodiment of the automatic classification result before and after the classification updating processing of the present embodiment in the case of not-classified occurring in FIG. 14. FIG. 15(a) illustrates an automatic classification result (comparative example) using the old knowledge base before the classification updating, and FIG. 15(b) illustrates an automatic classification result using the current knowledge base after the updating processing. As shown in FIG. 15(a), in the automatic classification processing using the old knowledge base before the classification updating, "Shop NEW de hamburger" is input in a field 1510 for registering input classification information. At this time, since the Shop NEW is not registered in the auxiliary classification table 420, a field 1520 for displaying the automatic classification result displays cooked food (BBB) as the maximum likelihood value. As for the sections of the information referred to, the information on Shop NEW is set as a null section as shown in a field 1530, and the information is not registered also for the binary condition as shown in a field 1540.

In the situation of FIG. 15(a), the expert user sets the respective setting values in fields 1550 and 1560 using his/her expertise know-how, and sends the same to the server 104, whereby the server 104 automatically updates the knowledge base evolutionally. At this time, since it is impossible to judge whether the Shop NEW belongs to the main classification table 1410 or the auxiliary classification table 1420, options for classification words and related words also may be displayed. Then, next time or later, the server 104 generates the automatic classification result 1570 given by FIG. 15(b) as the classification information including "Shop NEW", and displays the classification confirmation GUI of FIG. 15(b) to the user.

The automatic classification result using the knowledge base after the updating processing displays, for the classification information shown in a field 1580, proper classification identification values for the Shop NEW and the Shop NEW de hamburger, which are registered as related words in the auxiliary classification table 420 shown in a field 1590. A field 1595 indicating the binary condition displays a binary condition designated by the expert. That is, in the updated current knowledge base, when "Shop NEW de hamburger" is acquired as the classification information, the items corrected by the expert user are reflected on all the fields, thus showing that the proper classification result from the expert viewpoint can be given.

As stated above, according to the present embodiment, the accuracy of automatic classification processing using a knowledge base is presented to an expert user in a form making it easy to extract the expert user's know-how, thus enabling evolutionary updating of the knowledge base. As a result, it becomes possible to extract the know-how that the expert user stores in accordance with the degree of the classification information that requires the know-how, thus enabling the easy export of the expert know-how to the knowledge base.

Figure 16:
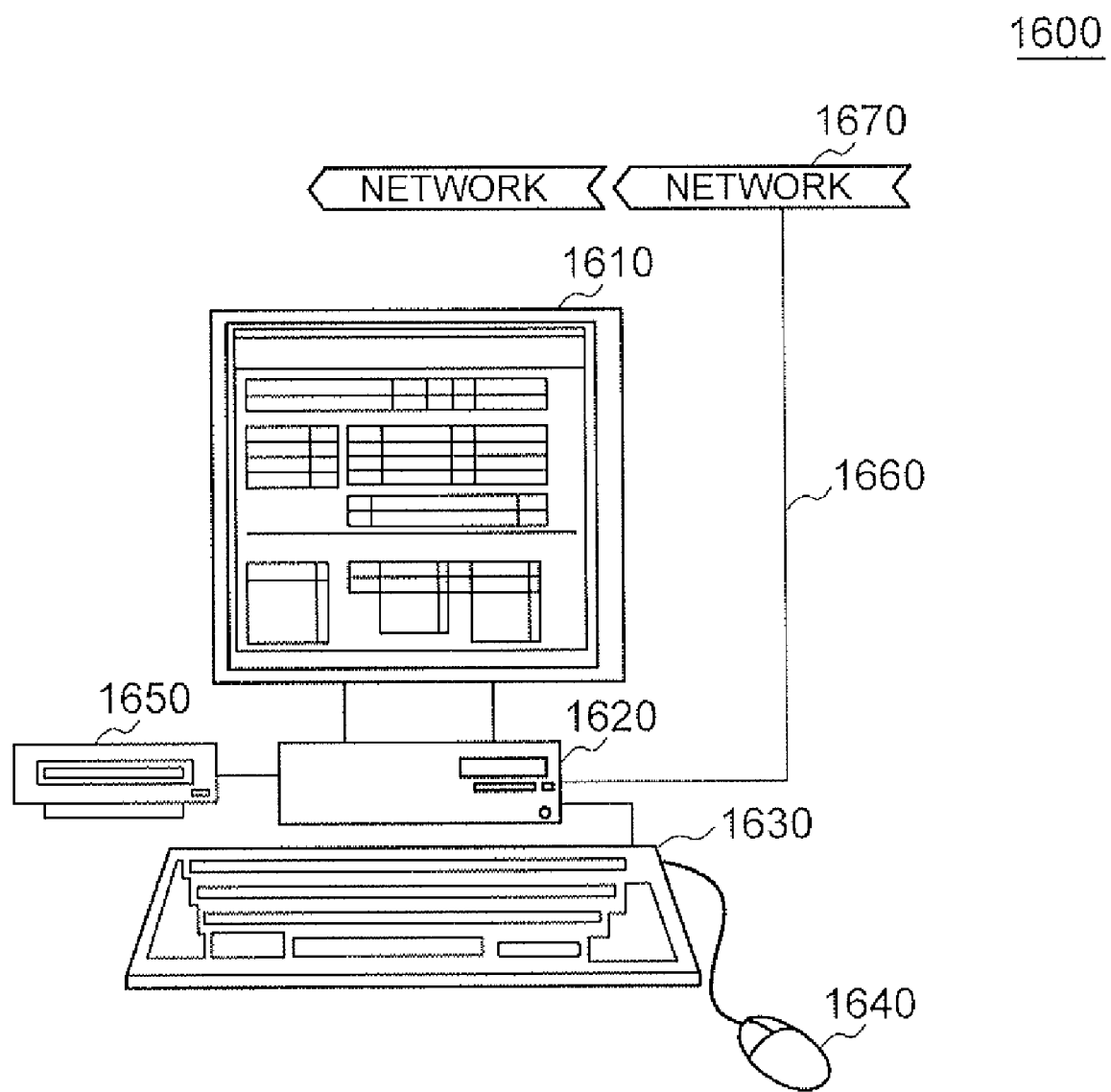
FIG. 16 illustrates one embodiment of an information processing apparatus implementing the information classification method of the present embodiment.

FIG. 16 illustrates one embodiment of an information processing apparatus 1600 implementing the information classification method of the present embodiment. The information processing apparatus 1600 includes a personal computer 1620, a display device 1610 displaying a result of the information classification processing, thus making a user to confirm the classification, and input/output devices such as a keyboard 1630 and a mouse 1640. The information processing apparatus 1600 further includes an external storage device 1650 such as a DVD, a CD-ROM, or a CD-RW, so as to fetch data from various media and write data thereon.

The information processing apparatus 1600 functions as, in the present embodiment, the client 102 that presents a classification confirmation GUI for displaying the automatic classification result from the server 104. In this embodiment, access is made to the server 104 via a LAN 1660 and a network 1670 such as the Internet, and classification information and an information classification request including a region, purchased quantity, income, household number and the like are sent to the server 104. The server 104 receives the information classification request and executes information classification processing, and then returns a result thereof to the client 102 as the classification confirmation GUI 800. The user approves or corrects the automatic classification result while referring to the automatic classification result displayed in the classification confirmation GUI 800 on a desktop screen of the client 102.

If the user corrects the result, the server 104 makes the corrected contents reflected on the contents of the knowledge base while referring to the log data 290 about the corrected section, so as to update the knowledge base evolutionally. In the illustrated embodiment, the expert user is allowed to use his/her expertise knowledge and reflect their know-how on the knowledge base. The illustrated embodiment of the information processing apparatus 1600 is sufficiently applicable to private applications as a SNS service via a network, for example, "net household accounts", "net accounting classification" and the like. In this embodiment, however, the operation efficiency of the server 104 can be improved, but there might be a possibility that the expertise levels of users who update the knowledge base cannot be unified.

From the aspect of the improvement in operation efficiency of the server 104 as well as the management of expertise levels of expert users, the following another embodiment is also possible. In this embodiment, the information processing apparatus 1600 functions as a terminal for allowing the user to do maintenance of the knowledge base of the server 104 as well. In this embodiment, when a general user sends classification information from the client 102 to the server 104, the server 104 stores the classification information corresponding to a fixed number of transactions in an appropriate storage region, e.g., a job queue without performing the classification processing. Thereafter, an expert user issues a classification processing request for the stored classification information to which classification processing has not been conducted, from the information processing apparatus 1600 to the server 104. The server 104 specifies the classification information as a target of the classification processing, reads out the classification information successively from the job queue and executes the classification processing.

The server 104 displays the classification confirmation GUI 800 displaying the automatic classification result as the classification result on the information processing apparatus 1600 as a terminal of the expert user, thus letting the approval or correction of the automatic classification result, and then the result is sent to the server 104. The server 104 refers to the log data 290 for each piece of classification information so as to reflect the result of the approval or correction by the expert user on the knowledge base, thus enabling the evolutional updating of the knowledge base while improving the operation efficiency of the server 104 and ensuring the expertise level of the expert user. This embodiment as stated above is preferable to pre-processing of the statistics analysis for consumption trend, household trend or the like, or for the implementation as a classification module of a statistic analysis apparatus because it can ensure the expert user's level and enable the information classification based on the sophisticated know-how.

In still another embodiment, technical classification such as International Patent Classification (IPC), FI term, F term and the like in which technical information is specified by a specific code can be used to update the knowledge base evolutionally using the classification result of the expert user. In such an embodiment, IPC classification simply gives a classification code G06F17/00 to "database", for example. However, when the classification information is set as "language processing for database" enabling the inclusion of semantics as in the present embodiment, the classification can be narrowed down to G06F17/27 and G06F17/30. The expert user's know-how is further applied to this automatic classification, thus enabling more effective assignment of the technical classification code.

Note here that the present embodiment can be applied to languages other than Japanese, such as English and German when the classification information includes a classification target word and a word giving a semantic attribute modifying the classification target word, e.g., "Sushi at Sushi-bar A", "Hamburger at Restaurant A", "Language Analysis for Database". The classification information is not limited to two words as long as it is configured as a short sentence. For instance, as long as it is a short sentence including one or more classification target words and semantic attributes, such as a compound word consisting of a plurality of words or a short sentence consisting of three words, the number of words is not limited.

While the present invention has been described with respect to the respective functional means and the processing by the respective functional means for easy understanding of the present invention, the present invention can assign the functions for implementing the above-stated processing to any functional means with consideration given to the processing efficiency and the programming efficiency for implementation, in addition to the case where the above-stated functional means perform special processing.

The above-stated functions of the present invention can be implemented as a device executable program described in an object-oriented programming language, or a search dedicated language such as SQL, which can be stored in a device readable recording medium for distribution, or transmitted for distribution.

While the present invention has been described by way of specific embodiments, the present invention is not limited to the embodiments, and another embodiment, addition, change and deletion are all possible as long as they are obvious to those skilled in the art. Any embodiment will be within the scope of the present invention as long as the effects of the present invention can be obtained therefrom.

What is claimed is:

1. An information classification system that classifies information by assigning a classification identification value to the information, comprising:
a computer system, including:
a knowledge base that receives classification information to be classified as a word string, conducts language analysis of the classification information to acquire a plurality of keywords that the classification information includes and classify the plurality of keywords into elements made up of a classification target word and a related word that modifies the classification target word, and conducts a search with the related word being for a judgment condition for decision of the classification while separating the classification target word from the related word, so as to assign the classification identification value to the information;

a classification candidate extraction section that extracts the classification identification value that the knowledge base assigns to generate an automatic classification result; and a classification update section that receives the automatic classification result, displays a GUI for classification confirmation allowing confirmation of correctness of the automatic classification result, and corrects registered items in the knowledge base with a correction value received through the GUI for classification confirmation while referring to log data that is a processing history about automatic classification for the language analysis and the element classification;

wherein the knowledge base comprises:

a language analysis section that extracts a plurality of keywords from the classification information while referring to a word dictionary database; and a language element classification section that classifies the extracted plurality of keywords into the classification target word and the related word that modifies the classification target word by referring to a classification database and when a binary condition is registered for the classification target word, prioritizes a judgment based on the binary condition.

2. The information classification system according to claim 1, wherein the word dictionary database includes a morpheme keyword, an expression instability keyword, and a higher/lower level concept keyword registered therein, and the classification database includes a main classification table, an auxiliary classification table, and a binary condition table registered therein, the main classification table associating the classification target word with the classification identification value, the auxiliary classification table associating the related word that modifies the classification target word with a semantic attribute, and the binary condition table associating a binary condition set for the classification identification value about the classification target word with a judgment result using the binary condition.

3. The information classification system according to claim 2, wherein the classification update section receives correction of a reference condition for correcting a binary condition or a weighting via the GUI for classification confirmation, and updates the binary condition table by correcting the binary condition.

4. The information classification system according to claim 3, wherein the classification database further includes an additional attribute registered therein that modifies the classification target word, and the binary condition is extracted from the related word, the additional attribute and the classification identification value and is registered in the binary condition table together with a result of the extraction.

5. The information classification system according to claim 4, wherein the classification information is a string of words semantically related in a short sentence that includes at least a classification target word.

6. The information classification system according to claim 1, wherein the information classification system receives the classification information and the correction via a network, the correction being conducted with an expert user's know-how reflected thereon.

7. An information classification apparatus that classifies information by assigning a classification identification value to the information, comprising:

a computer system, including:

a knowledge base that receives classification information to be classified as a word string, conducts language analysis of the classification information to acquire a plurality of keywords that the classification information includes and classify the plurality of keywords into elements made up of a classification target word and a related word that modifies the classification target word, and conducts a search with the related word being for a judgment condition for decision of the classification while separating the classification target word from the related word, so as to assign the classification identification value to the information;

a classification candidate extraction section that extracts the classification identification value that the knowledge base assigns to generate an automatic classification result; and a classification update section that receives the automatic classification result, displays a GUI for classification confirmation allowing confirmation of correctness of the automatic classification result, and corrects registered items in the knowledge base with a correction value received through the GUI for classification confirmation while referring to log data that is a processing history about automatic classification for the language analysis and the element classification;

wherein the knowledge base comprises:

a language analysis section that extracts a plurality of keywords from the classification information while referring to a word dictionary database; and a language element classification section that classifies the extracted plurality of keywords into the classification target word and the related word that modifies the classification target word by referring to a classification database and when a binary condition is registered for the classification target word, prioritizes a judgment based on the binary condition.

8. The information classification apparatus according to claim 7, wherein the word dictionary database includes a morpheme keyword, an expression instability keyword, and a higher/lower level concept keyword registered therein, and the classification database includes a main classification table, an auxiliary classification table, and a binary condition table registered therein, the main classification table associating the classification target word with the classification identification value, the auxiliary classification table associating the related word that modifies the classification target word with a semantic attribute, and the binary condition table associating a binary condition set for the classification identification value about the classification target word with a judgment result using the binary condition.

9. The information classification apparatus according to claim 8, wherein the classification database further includes an additional attribute registered therein that modifies the classification target word, and the binary condition is extracted from the related word, the additional attribute and the classification identification value and is registered in the binary condition table together with the judgment result.

10. The information classification apparatus according to claim 9, wherein the classification information is a string of words semantically related in a short sentence that includes at least a classification target word.

11. An information classification method executed by an information classification apparatus that classifies information by assigning a classification identification value to the information, the method comprising the steps executed by a computer system of the information classification apparatus of:

receiving classification information to be classified as a word string, and conducting language analysis of the classification information;

acquiring a plurality of keywords that the classification information includes, classifying the plurality of keywords into elements made up of a classification target word and a related word that modifies the classification target word, and conducting a search with the related word being for a judgment condition for decision of the classification while separating the classification target word from the related word, so as to assign the classification identification value to the information;

extracting the assigned classification identification value to generate an automatic classification result;

receiving the automatic classification result, and displaying a GUI for classification confirmation allowing confirmation of correctness of the automatic classification result; and correcting registered items in a knowledge base with a correction value received through the GUI for classification confirmation while referring to log data that is a processing history about automatic classification for the language analysis and the element classification;

wherein the language analysis conducting step comprises the step of extracting a plurality of keywords from the classification information while referring to a word dictionary database; and the classification identification value assigning step comprises the steps of classifying the extracted plurality of keywords into the classification target word and the related word that modifies the classification target word by referring to a classification database and when a binary condition is registered for the classification target word, prioritizing a judgment based on the binary condition.

12. The information classification method according to claim 11, wherein:

the word dictionary database includes a morpheme keyword, an expression instability keyword, and a higher/lower level concept keyword registered therein, the classification database includes a main classification table, an auxiliary classification table, and a binary condition table registered therein, the main classification table associating the classification target word with the classification identification value, the auxiliary classification table associating the related word that modifies the classification target word with a semantic attribute, and the binary condition table associating a binary condition set for the classification identification value about the classification target word with a judgment result using the binary condition, and the registered item correcting step includes the steps of receiving correction of a reference condition for correcting a binary condition or a weighting via the GUI for classification confirmation, and updating the binary condition table with a value of the corrected binary condition or an additional attribute.

13. The information classification method according to claim 12, further comprising the step of receiving, via a network, the classification information as a string of words semantically related in a short sentence that includes at least a classification target word.

14. A program, embodied on a non-transitory computer readable storage medium, and executable by an information classification apparatus that classifies information by assigning a classification identification value to the information, the program causing the information classification apparatus to execute the steps of:

receiving classification information to be classified as a word string, and conducting language analysis of the classification information;

acquiring a plurality of keywords that the classification information includes, classifying the plurality of keywords into elements made up of a classification target word and a related word that modifies the classification target word, and conducting a search with the related word being for a judgment condition for decision of the classification while separating the classification target word from the related word, so as to assign the classification identification value to the information;

extracting the assigned classification identification value to generate an automatic classification result;

receiving the automatic classification result, and displaying a GUI for classification confirmation allowing confirmation of correctness of the automatic classification result; and correcting registered items in a knowledge base with a correction value received through the GUI for classification confirmation while referring to log data about automatic classification for the language analysis and the element classification;

wherein the language analysis conducting step comprises the step of extracting a plurality of keywords from the classification information while referring to a word dictionary database; and the classification identification value assigning step comprises the steps of classifying the extracted plurality of keywords into the classification target word and the related word that modifies the classification target word by referring to a classification database and when a binary condition is registered for the classification target word, prioritizing a judgment based on the binary condition.

15. The program according to claim 14, wherein the word dictionary database includes a morpheme keyword, an expression instability keyword, and a higher/lower level concept keyword registered therein, the classification database includes a main classification table, an auxiliary classification table, a binary condition table, and an additional attribute registered therein, the main classification table associating the classification target word with the classification identification value, the auxiliary classification table associating the related word that modifies the classification target word with a semantic attribute, the binary condition table associating a binary condition set and extracted from the related word registered in the auxiliary classification table with a judgment result using the binary condition, and the additional attribute modifying the classification target word, and the registered item correcting step comprises the steps of receiving correction of a reference condition for correcting a binary condition or a weighting via the GUI for classification confirmation, and updating the binary condition table with a value of the corrected binary condition or the additional attribute.

16. The program according to claim 15, further causing the information classification apparatus to execute the step of receiving, via a network, the classification information as a string of words semantically related in a short sentence that includes at least a classification target word.

* * * * *